(12) United States Patent
Shinohara

(10) Patent No.: US 10,837,975 B2
(45) Date of Patent: Nov. 17, 2020

(54) AUTOMATIC ANALYZING APPARATUS, REAGENT CONTAINER STOCK APPARATUS, AND SPECIFYING METHOD

(71) Applicant: Canon Medical Systems Corporation, Otawara (JP)

(72) Inventor: Hiroo Shinohara, Nasushiobara (JP)

(73) Assignee: Canon Medical Systems Corporation, Otawara (JP)

(*) Notice: Subject to any disclaimer, the term of this patent is extended or adjusted under 35 U.S.C. 154(b) by 287 days.

(21) Appl. No.: 16/009,413

(22) Filed: Jun. 15, 2018

(65) Prior Publication Data

US 2018/0364267 A1 Dec. 20, 2018

(30) Foreign Application Priority Data

Jun. 19, 2017 (JP) ................................. 2017-119391
Jun. 13, 2018 (JP) ................................. 2018-112831

(51) Int. Cl.
*G01N 35/00* (2006.01)
*G01N 35/10* (2006.01)
*G01N 35/04* (2006.01)

(52) U.S. Cl.
CPC ....... *G01N 35/00732* (2013.01); *G01N 35/10* (2013.01); *G01N 35/1002* (2013.01); *G01N 2035/00782* (2013.01); *G01N 2035/00801* (2013.01); *G01N 2035/00831* (2013.01); *G01N 2035/00881* (2013.01); *G01N 2035/0443* (2013.01)

(58) Field of Classification Search
None
See application file for complete search history.

(56) References Cited

U.S. PATENT DOCUMENTS

| 10,534,939 B1* | 1/2020 | Bellows | G06K 7/10356 |
| 2010/0156606 A1* | 6/2010 | Gold | H04Q 9/00 340/10.4 |
| 2014/0050622 A1 | 2/2014 | Kitagawa et al. | |
| 2017/0286903 A1* | 10/2017 | Elizondo, II | H04B 17/318 |

FOREIGN PATENT DOCUMENTS

JP 2012-198174 10/2012

* cited by examiner

*Primary Examiner* — Kathryn Wright
(74) *Attorney, Agent, or Firm* — Oblon, McClelland, Maier & Neustadt, L.L.P.

(57) ABSTRACT

An automatic analyzing apparatus includes a reagent depository, a wave radiator, a wave receiver, a switcher, and processing circuitry. The wave radiator sends a radio wave to a plurality of wireless tags. The wireless tags are comprised by respective reagent containers in the reagent depository or by respective reagent containers at a reagent retaining space. The wave receiver receives return radio waves from the wireless tags that have received the radio wave. The switcher changes a response state of one of the wireless tags. The processing circuitry specifies reagent information corresponding to the reagent container that comprises the response state-changed wireless tag, based on the return radio waves received before and after the response state is changed.

15 Claims, 10 Drawing Sheets

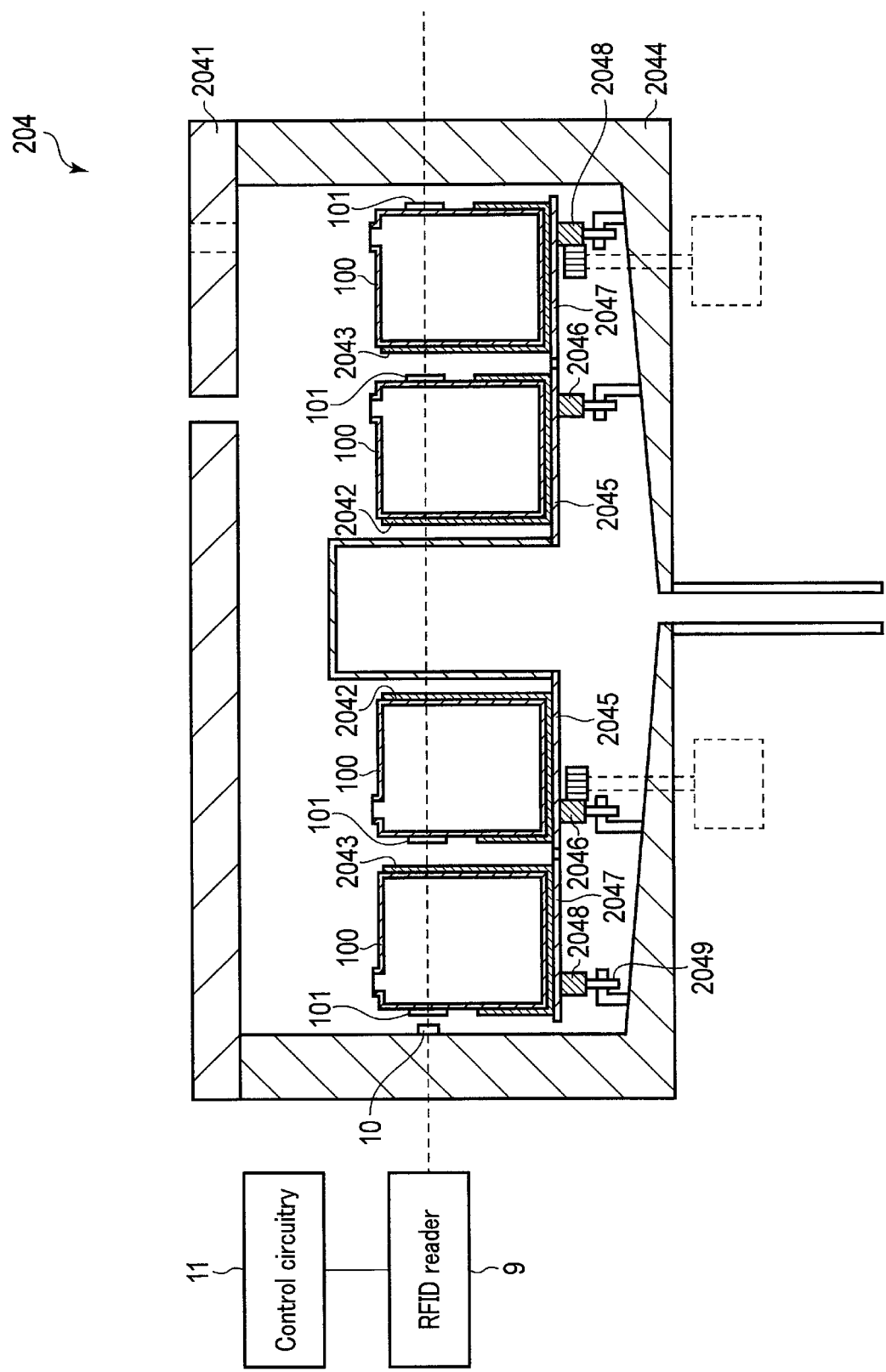
F I G. 5

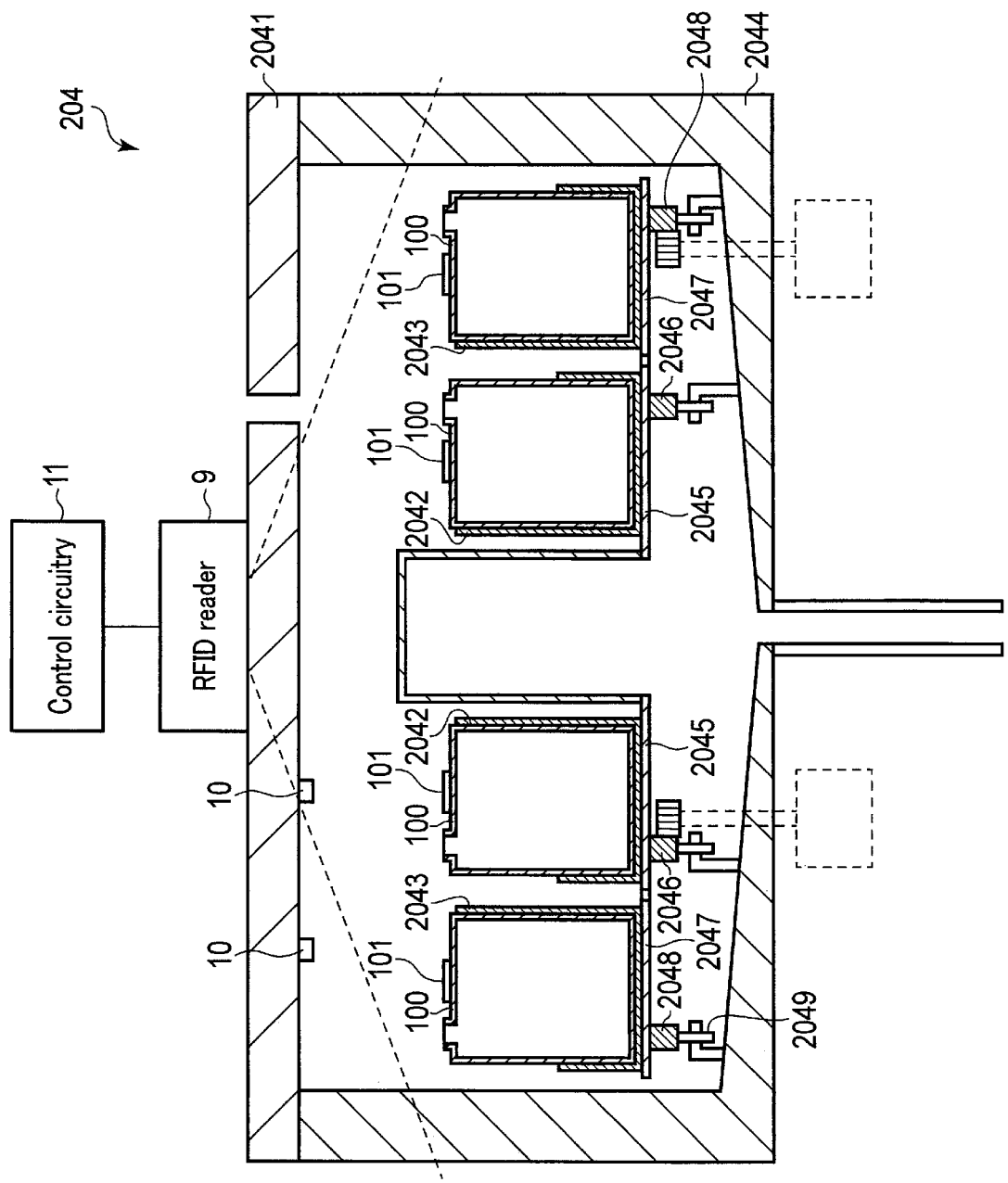
F I G. 7

AUTOMATIC ANALYZING APPARATUS, REAGENT CONTAINER STOCK APPARATUS, AND SPECIFYING METHOD

CROSS-REFERENCE TO RELATED APPLICATIONS

This application is based upon and claims the benefit of priority from prior Japanese Patent Application No. 2017-119391, filed Jun. 19, 2017, and No. 2018-112831, filed Jun. 13, 2018, the entire contents of both which are incorporated herein by reference.

FIELD

Embodiments described herein relate generally to an automatic analyzing apparatus, a reagent container stock apparatus, and a specifying method.

BACKGROUND

An automatic analyzing apparatus is an apparatus adapted for analyzing components of a test sample, such as blood, with respect to various test items, and it conducts the analysis through, for example, optical measurement of a mixture liquid prepared by mixing the sample with reagents related to the test items.

For use in such an automatic analyzing apparatus, reagent containers to hold reagents are affixed with information labels so that information about the reagents is automatically conveyed to the automatic analyzing apparatus. As the reagent information labels, barcode labels have long been adopted. One-dimensionally designed barcode labels use a numerical string of 20 digits or so for indicating information such as a reagent manufacturer code, a reagent item code, a container size, a volume, a production lot number, a validity period, etc.

Numerical strings that appear on the information labels affixed to reagent containers are read by a barcode reader installed at a reagent depository. The read character strings are decoded with reference to, for example, a preset correspondence table, and the information acquired after the decoding is stored in storage circuitry of the automatic analyzing apparatus. The stored information will be utilized for an operation of dispensing reagents, an operation of displaying remaining amounts, stock locations, etc., of the reagents, and so on.

Turning to the recent trend in the medical front, use of a radio frequency identifier (RFID) system is on trial, in place of the barcode system. The RFID system, for example, attaches a wireless tag to a reagent container, and arranges a wireless tag reader at the entrance of a test room or in front of a refrigerating room for keeping reagents. This allows reagent containers, which are being carried into the test room or the reagent-keeping refrigerating room, to be recognized only by having cartons containing the multiple reagent containers pass through the entrance of the test room or the front of the reagent-keeping refrigerating room.

As such, the RFID system is effective in determining the presence of given reagent containers within a communication range of the wireless tag reader, when there are multiple, wireless tag-attached reagent containers within the communication range. Also in such conditions, the RFID system is effective in determining the types of reagent containers covered by the communication range. Thus, excellent advantages in reagents' inventory control and the like may be expected from the use of the RFID system, which would consequently mitigate the labor of the testing staff.

Nevertheless, in the instances discussed, the RFID system is not readily capable of unambiguously associating the data read by the wireless tag reader with the data belonging to a specific wireless tag. As a result, when the RFID system is applied to the management of reagent containers kept in a reagent depository of the automatic analyzing apparatus, one would face the difficulty in specifying which wireless tag affixed to the reagent container (that can be located at any position in the reagent depository) the data read by the wireless tag reader corresponds to.

These circumstances must therefore assume a settlement where the RFID system is applied to the reagents' inventory control but the conventional barcode system is continued to be adopted for the management of reagents within a reagent depository. This would result in operations with lower efficiency, as involving two types of information indicators, i.e., a barcode label and a wireless tag, attached to each reagent container.

BRIEF DESCRIPTION OF THE DRAWINGS

FIG. 5 is a diagram showing one structure for a reagent container stock apparatus according to the first embodiment.

FIG. 7 is a diagram showing another structure for the reagent container stock apparatus of FIG. 5.

DETAILED DESCRIPTION

In general, according to one embodiment, an automatic analyzing apparatus includes a reagent depository, a wave radiator, a wave receiver, a switcher, and processing circuitry. The wave radiator sends a radio wave to a plurality of wireless tags. The wireless tags are comprised by respective reagent containers in the reagent depository or by respective reagent containers at a reagent retaining space. The wave receiver receives return radio waves from the wireless tags that have received the radio wave. The switcher changes a response state of one of the wireless tags. The processing circuitry specifies reagent information corresponding to the reagent container that comprises the response state-changed wireless tag, based on the return radio waves received before and after the response state is changed.

First Embodiment

Figure 1:
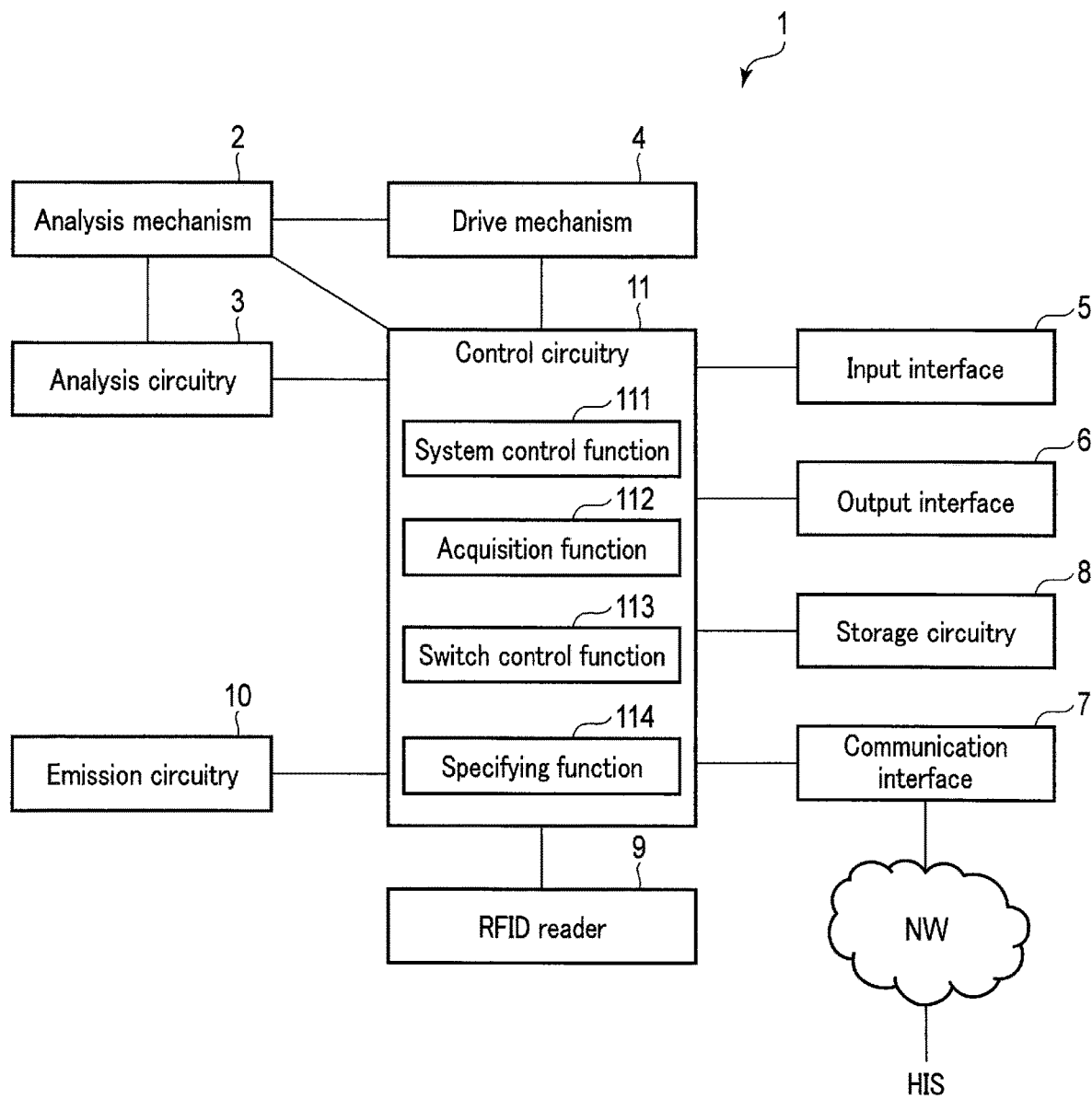
FIG. 1 is a block diagram showing one functional configuration for an automatic analyzing apparatus according to a first embodiment.

FIG. 1 is a block diagram showing an exemplary functional configuration for an automatic analyzing apparatus 1 according to the first embodiment. In FIG. 1, the automatic analyzing apparatus 1 includes an analysis mechanism 2, analysis circuitry 3, a drive mechanism 4, an input interface 5, an output interface 6, a communication interface 7, storage circuitry 8, an RFID reader 9, emission circuitry 10, and control circuitry 11.

The analysis mechanism 2 mixes a sample, such as a standard sample or a subject sample, with a reagent that will be used in a test item set for the sample. The analysis mechanism 2 measures the mixture liquid of the sample and the reagent, and generates standard data and subject data which may be represented as, for example, an absorbency level.

The analysis circuitry 3 is a processor to analyze the standard data and the subject data, generated by the analysis mechanism 2, to generate calibration data, analysis data, etc. The analysis circuitry 3 reads operation programs from the storage circuitry 8, and generates these calibration data, the analysis data, and so on, based on the operation programs. For example, the analysis circuitry 3 refers to the standard data, and generates the calibration data indicative of a relationship between the standard data and a standard value predetermined for a standard sample. Also, the analysis circuitry 3 refers to the subject data and the calibration data for a test item corresponding to this subject data, and generates the analysis data represented as a concentration value and an enzyme activity value. The analysis circuitry 3 outputs the generated data, including the calibration data, the analysis data, etc., to the control circuitry 11.

The drive mechanism 4 drives the analysis mechanism 2 under the control of the control circuitry 11. The drive mechanism 4 is realized by, for example, a gear, a stepping motor, a belt conveyor, a lead screw, and so on.

The input interface 5 accepts, for example, setting details of analysis parameters, etc., for each test item intended for measurement-requested samples, from an operator or via an in-hospital network NW. The input interface 5 may be realized by a mouse, a keyboard, a touch pad which receives input instructions through contact of its operation screen, or the like. The input interface 5 is connected to the control circuitry 11 so that it converts operational instructions input by an operator into electric signals and outputs them to the control circuitry 11. For the present disclosure, the input interface 5 is not limited to physical operating components such as a mouse and a keyboard. Examples of the input interface 5 may also include processing circuitry for electric signals, which receives an electric signal corresponding to an operational instruction from an external input device separate from the automatic analyzing apparatus 1, and outputs the electric signal to the control circuitry 11.

The output interface 6 is connected to the control circuitry 11 and outputs the signals coming from the control circuitry 11. The output interface 6 is realized by, for example, display circuitry, print circuitry, an audio device, or the like. Such display circuitry may be a CRT display, a liquid crystal display, an organic EL display, an LED display, a plasma display, etc. Examples of the display circuitry also include processing circuitry that converts data of a display subject into video signals and supplies the video signals to external entities. The print circuitry may be a printer, etc. Examples of the print circuitry also include output circuitry that supplies data of a print subject to external entities. The audio device may be a speaker, etc. Examples of the audio device also include output circuitry that supplies audio signals to external entities.

The communication interface 7 is connected to, for example, the in-hospital network NW. The communication interface 7 performs data communication with a hospital information system (HIS) via the in-hospital network NW. It is also possible for the communication interface 7 to perform data communication with the HIS via a laboratory information system (LIS) connected to the in-hospital network NW.

The storage circuitry 8 may be, for example, a processor-readable storage medium, such as a magnetic or optical storage medium or a semiconductor memory. It is not a requisite to realize the storage circuitry 8 by a single storage medium. For example, the storage circuitry 8 may be realized by multiple storage media.

The storage circuitry 8 stores operation programs for the analysis circuitry 3 to execute, and operation programs for realizing functions of the control circuitry 11. The storage circuitry 8 stores the calibration data generated by the analysis circuitry 3, for each test item. The storage circuitry 8 also stores the analysis data generated by the analysis circuitry 3, for each subject sample. The storage circuitry 8 stores a test order input from an operator, or a test order received by the communication interface 7 via the in-hospital network NW. The storage circuitry 8 further stores reagent information read from wireless tags 101 affixed to respective reagent containers 100 kept in a first-reagent depository 204 and a second-reagent depository 205, which will be described later. Note that the reagent information in the context of the first embodiment refers to, for example, the information about a reagent contained in the reagent container 100.

The RFID reader 9 reads the reagent information stored in the wireless tags 101 affixed to the respective reagent containers 100 kept in the first-reagent depository 204 and the second-reagent depository 205. For example, the RFID reader 9 is arranged at a position that allows for wireless communications with the wireless tags 101 affixed to the reagent containers 100 kept in the first-reagent depository 204, or in the second-reagent depository 205. It is possible to adopt a configuration in which a single RFID reader 9 covers the wireless communications with both the wireless tags 101 affixed to the reagent containers 100 in the first-reagent depository 204 and the wireless tags 101 affixed to the reagent containers 100 in the second-reagent depository 205. For this configuration, the RFID reader 9 is arranged at a position that allows for wireless communications with the wireless tags 101 affixed to the reagent containers 100 in the first-reagent depository 204, and also those in the second-reagent depository 205.

Under the control of the control circuitry 11, the RFID reader 9 radiates a radio wave of a preset frequency toward the first-reagent depository 204, the second-reagent depository 205, or both the first-reagent depository 204 and the second-reagent depository 205. That is, the RFID reader 9 operates as one example of a wave radiator. The RFID reader 9 then receives radio waves that are returned from the wireless tags 101 according to the sent radio wave. The RFID reader 9 thus operates also as one example of a wave receiver. The RFID reader 9 converts the received radio waves into electric signals, and outputs the electric signals to the control circuitry 11.

The emission circuitry 10 is one example of a switcher for switching the response states of the wireless tags 101. The emission circuitry 10 is for emission of an electromagnetic wave of a preset frequency to the wireless tags 101 affixed to the reagent containers 100 in the first-reagent depository 204 and the second-reagent depository 205. Here, the emission circuitry 10 is given an adjusted directivity so that the electromagnetic wave can be emitted to only the wireless tag 101 affixed to one of the multiple reagent containers 100 kept in the first-reagent depository 204 and the second-reagent depository 205. The preset frequency is higher than that of the radio wave used for wireless communications between the RFID reader 9 and the wireless tags 101. That is, since the electromagnetic wave emitted by the emission circuitry 10 is of a shorter wavelength than the radio wave used for the wireless communications, it has a higher directivity. The emission circuitry 10 is arranged at a position where it can irradiate each of the wireless tags 101 affixed to the reagent containers 100 in the first-reagent depository 204 and the second-reagent depository 205, with the electromagnetic wave.

The description of the first embodiment assumes the instances where the emission circuitry 10 emits light as the electromagnetic wave. Note that the light emitted by the emission circuitry 10 may be any type of light, including infrared light, visible light, and so on. The emission circuitry 10 includes, for example, a light-emitting diode, a semiconductor laser, a light source lamp, or the like. For example, the emission circuitry 10 drives the light-emitting diode, the semiconductor laser, the light source lamp, or the like to emit spot light of a given diameter to the wireless tag 101, under the control of the control circuitry 11. The diameter of the spot light may be reduced using a slit, a lens, etc.

The control circuitry 11 is a processor functioning as a center of the automatic analyzing apparatus 1, and is one example of processing circuitry. The control circuitry 11 executes the operation programs stored in the storage circuitry 8 to realize functions corresponding to the operation programs. The control circuitry 11 may be provided with a storage area to store at least part of the data stored in the storage circuitry 8.

Figure 2:
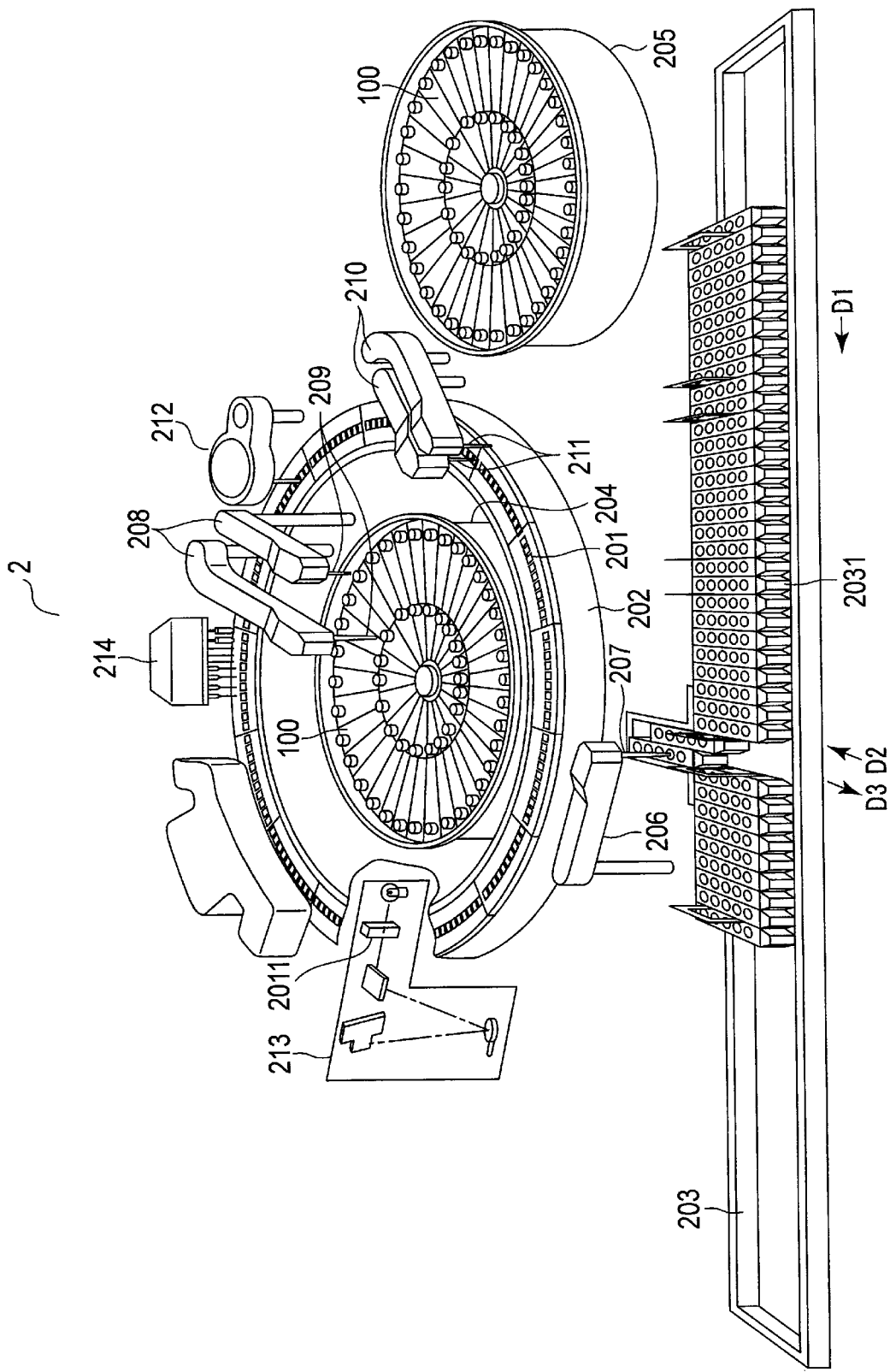
FIG. 2 is a diagram showing one design for the analysis mechanism of FIG. 1.

FIG. 2 schematically shows one exemplary design for the analysis mechanism 2 of FIG. 1. In FIG. 2, the analysis mechanism 2 includes a reaction disk 201, a constant temperature part 202, a rack sampler 203, the first-reagent depository 204, and the second-reagent depository 205.

The reaction disk 201 is one example of a conveyor for conveying reaction containers 2011 along a predetermined path. More specifically, the reaction disk 201 holds the multiple reaction containers 2011 in an annular arrangement. The reaction disk 201 is rotated and stopped alternately at prescribed regular time intervals by the drive mechanism 4. The reaction containers 2011 are formed of, for example, glass.

The constant temperature part 202 stores a thermal medium that is set at a predetermined temperature. By immersing the reaction containers 2011 in the stored thermal medium, the constant temperature part 202 increases the temperature of the mixture liquid contained in the reaction containers 2011.

The rack sampler 203 supports sample racks 2031 each adapted to hold multiple sample containers containing measurement-requested samples, in such a manner that the sample racks 2031 is movable. FIG. 2 shows an example in which the sample racks 2031 each capable of holding a row of five sample containers are provided.

The rack sampler 203 includes a conveyor region for conveying the sample racks 2031 from a slot position for slotting in the sample racks 2031, to a recovery position for collecting the sample racks 2031 having undergone the measurement. In the conveyor region, the multiple sample racks 2031 are aligned laterally and moved in a direction D1 by the drive mechanism 4.

The rack sampler 203 also includes a carry-in region for drawing the sample racks 2031 from the conveyor region so that the sample containers held by each sample rack 2031 are moved to a predetermined sample aspiration position. The sample aspiration position is set at, for example, the intersection between the rotational trajectory of a sample dispensing probe 207, and the traveling path of the openings of the sample containers held by the sample rack 2031 and supported by the rack sampler 203. In the carry-in region, the incoming sample rack 2031 is moved in a direction D2 by the drive mechanism 4.

The rack sampler 203 further includes a carry-back region for returning the sample rack 2031 holding the sample containers from which samples have been aspirated, to the conveyor region. In the carry-back region, the sample rack 2031 is moved in a direction D3 by the drive mechanism 4.

The first-reagent depository 204 is adapted for the cold storage of the multiple reagent containers 100 that contain a first reagent for reaction with a given component of standard samples and subject samples. While not shown in FIG. 2, the first-reagent depository 204 is masked by a detachable reagent cover. The first-reagent depository 204 encloses reagent racks in such a manner that the reagent racks can be rotated. The reagent racks together hold the multiple reagent containers 100 in an annular arrangement. The reagent racks are rotated by the drive mechanism 4.

A predetermined first-reagent aspiration position is provided above the first-reagent depository 204. The first-reagent aspiration position is set at, for example, the intersection between the rotational trajectory of a first-reagent dispensing probe 209 and the traveling path of the openings of the reagent containers 100 annularly arranged by the reagent racks.

The second-reagent depository 205 is adapted for the cold storage of the reagent containers 100 that contain a second reagent for constituting a dual-reagent system with the first reagent. While not shown in FIG. 2, the second-reagent depository 205 is masked by a detachable reagent cover. The second-reagent depository 205 encloses reagent racks in such a manner that the reagent racks can be rotated. The reagent racks together hold the multiple reagent containers 100 in an annular arrangement. Note that the second reagents refrigerated in the second-reagent depository 205 may have the same ingredients and the same concentration as the first reagents refrigerated in the first-reagent depository 204.

A predetermined second-reagent aspiration position is provided above the second-reagent depository 205. The second-reagent aspiration position is set at, for example, the intersection between the rotational trajectory of a second-reagent dispensing probe 211 and the traveling path of the openings of the reagent containers 100 annularly arranged by the reagent racks.

Figure 3:
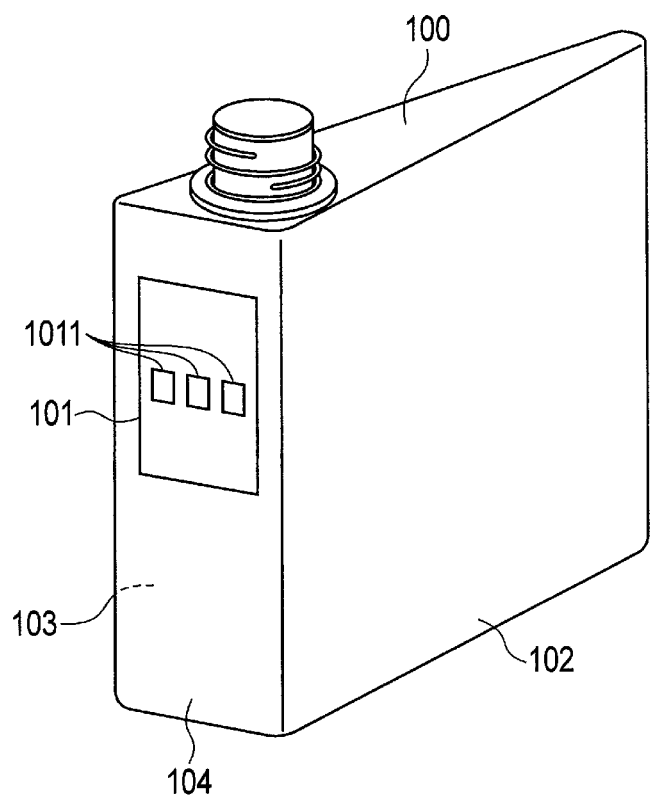
FIG. 3 is a diagram showing a reagent container intended for the cold storage in a first-reagent depository and a second-reagent depository as shown in FIG. 2.

FIG. 3 schematically shows one example of the reagent containers 100 refrigerated in the first-reagent depository 204 and the second-reagent depository 205 of FIG. 2. The reagent container 100 has a shape of, for example, a quadratic prism having trapezoidal bottom and top faces. The top face of the reagent container 100 has an opening for the reagent aspiration.

When a number of reagent containers 100 are held by the reagent racks, a first side face 102 and a second side face 103 of one reagent container 100 face a second side face 103 and a first side face 102 of the respective adjacent reagent containers 100. In the state where the reagent racks holding the multiple reagent containers 100 are fitted to the first-reagent depository 204 or to the second-reagent depository 205, the reagent containers 100 come to the annular arrangement and third side faces 104 of the reagent containers 100 face outward. The third side faces 104 are, for example, each affixed with the wireless tag 101. The wireless tag 101 has a surface provided with receive circuitry 1011 for receiving the electromagnetic wave emitted from the emission circuitry 10.

Note that the wireless tag 101 may be embedded in a reagent label affixed to the reagent container 100. In this instance, an optical mark indicative of the reagent information may also be printed on the reagent label. For such an optical mark, for example, any pixel codes such as one-dimensional pixel codes or two-dimensional pixel codes may be used.

The wireless tag 101 is an RFID tag adapted to transmit stored reagent information by means of radio waves.

Figure 4:
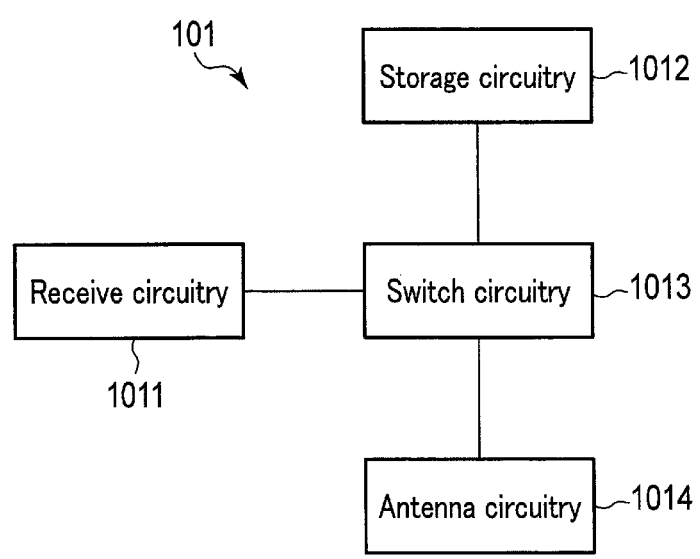
FIG. 4 is a diagram showing one configuration for a wireless tag as shown in FIG. 3.

FIG. 4 schematically shows one exemplary configuration for the wireless tag 101 of FIG. 3. As shown in FIG. 4, for example, each wireless tag 101 includes the receive circuitry 1011, storage circuitry 1012, switch circuitry 1013, and antenna circuitry 1014.

The receive circuitry 1011 is circuitry for receiving the electromagnetic wave emitted from the emission circuitry 10. The description of the first embodiment assumes the instances where the spot light emitted from the emission circuitry 10 is received. The receive circuitry 1011 senses light such as infrared rays or visible light, and outputs electric signals. The receive circuitry 1011 typically includes a semiconductor chip, such as a photo diode.

While the receive circuitry 1011 may be provided as a single element and disposed at a predetermined position of the wireless tag 101, it is also possible to provide more than one receive circuitry 1011 with given intervals. This can omit a care that could be otherwise required when positioning and affixing a great number of the wireless tags 101 (or the wireless tag-embedded reagent labels) to the reagent containers 100, and can accordingly improve the efficiency in the affixing work. Also, since the receive circuitry 1011 in this case is arranged at multiple positions, it becomes possible for the receive circuitry 1011 at one of the positions to sense the spot light from the emission circuitry 10 even if a position of the reagent container 100 is deviated from the emission circuitry 10.

The storage circuitry 1012 stores the reagent information. The reagent information is written in the storage circuitry 1012 at the time of, for example, shipment from a reagent manufacturer, in advance of the analysis processing by the automatic analyzing apparatus 1. The reagent information written at that time includes, for example, a reagent name, a reagent manufacturer code, a reagent item code, a bottle type, a bottle size, a volume, a production lot number, a bottle-specific ID (or wireless tag ID), a validity period, etc. If the automatic analyzing apparatus 1 is furnished with an RFID writer, any information for reagent management may be written in the storage circuitry 1012 from time to time. Such an RFID writer may be formed integrally with the RFID reader 9. That is, the RFID writer and the RFID reader 9 in this example may share the wave radiator component and the wave receiver component.

The switch circuitry 1013 switches between activating and inactivating a response to the radio wave from the RFID reader 9, based on the electric signal output from the receive circuitry 1011. For example, responsive to the electric signal from the receive circuitry 1011 as a trigger, the switch circuitry 1013 inactivates the response to the radio wave. For inactivating the response, a method to halt the return radio wave to the RFID reader 9, a method to include a meaningless message in the return radio wave, etc., are available. The switch circuitry 1013 activates the response to the radio wave when the supply of the electric signals from the receive circuitry 1011 is stopped.

The antenna circuitry 1014 receives the radio wave from the RFID reader 9. The antenna circuitry 1014 also sends out a radio wave carrying the reagent information stored in the storage circuitry, responsive to the received radio wave.

Note that the position to affix the wireless tag 101 is not limited to the third side face 104 of the reagent container 100. Depending on the position to install the RFID reader 9, the wireless tag 101 may be affixed to the top face of the reagent container 100.

The analysis mechanism 2 shown in FIG. 2 further includes a sample dispensing arm 206, the sample dispensing probe 207, a first-reagent dispensing arm 208, the first-reagent dispensing probe 209, a second-reagent dispensing arm 210, the second-reagent dispensing probe 211, a stirring unit 212, a photometry unit 213, and a washing unit 214.

The sample dispensing arm 206 is provided between the reaction disk 201 and the rack sampler 203. The sample dispensing arm 206 is adapted so that it can vertically ascend and descend, and also horizontally rotate, thanks to the drive mechanism 4. The sample dispensing arm 206 holds the sample dispensing probe 207 at its one end.

The sample dispensing probe 207 rotates along the arc rotational trajectory, in conjunction with the rotation of the sample dispensing arm 206. This rotational trajectory is set so that the openings of the sample containers held by the sample rack 2031 on the rack sampler 203 will be positioned on it. Also, the rotational trajectory of the sample dispensing probe 207 includes a sample discharge position for the sample dispensing probe 207 to discharge the aspirated sample to the reaction containers 2011. The sample discharge position corresponds to the intersection between the rotational trajectory of the sample dispensing probe 207 and the traveling path of the reaction containers 2011 held by the reaction disk 201.

The sample dispensing probe 207 is driven by the drive mechanism 4 so that it ascends and descends at a position directly above the opening of one sample container held by the sample rack 2031 on the rack sampler 203, or ascends and descends at the sample discharge position. The sample dispensing probe 207 also aspirates the sample from the sample container directly below it, under the control of the control circuitry 11. At the sample discharge position, the sample dispensing probe 207 discharges the aspirated sample to the reaction container 2011 directly below it, under the control of the control circuitry 11.

The first-reagent dispensing arm 208 is provided between the reaction disk 201 and the first-reagent depository 204. The first-reagent dispensing arm 208 is adapted so that it can vertically ascend and descend, and also horizontally rotate, thanks to the drive mechanism 4. The first-reagent dispensing arm 208 holds the first-reagent dispensing probe 209 at its one end.

The first-reagent dispensing probe 209 rotates along the arc rotational trajectory, in conjunction with the rotation of the first-reagent dispensing arm 208. This rotational trajectory includes the first-reagent aspiration position. Also, the rotational trajectory of the first-reagent dispensing probe 209 includes a first-reagent discharge position that is set for the first-reagent dispensing probe 209 to discharge the aspirated reagent to the reaction containers 2011. The first-reagent discharge position corresponds to the intersection between the rotational trajectory of the first-reagent dispensing probe 209 and the traveling path of the reaction containers 2011 held by the reaction disk 201.

The first-reagent dispensing probe 209 is driven by the drive mechanism 4 so that it ascends and descends at the first-reagent aspiration position or the first-reagent discharge position on the rotational trajectory. The first-reagent dispensing probe 209 aspirates the first reagent from the reagent container directly below it at the first-reagent aspiration position, under the control of the control circuitry 11. The first-reagent dispensing probe 209 is one example of an aspirator according to the first embodiment. Also, the first-reagent dispensing probe 209 discharges the aspirated first reagent to the reaction container 2011 directly below it at the first-reagent discharge position, under the control of the control circuitry 11.

The second-reagent dispensing arm 210 is provided between the reaction disk 201 and the second-reagent depository 205. The second-reagent dispensing arm 210 is adapted so that it can vertically ascend and descend, and also horizontally rotate, thanks to the drive mechanism 4. The second-reagent dispensing arm 210 holds the second-reagent dispensing probe 211 at its one end.

The second-reagent dispensing probe 211 rotates along the arc rotational trajectory, in conjunction with the rotation of the second-reagent dispensing arm 210. This rotational trajectory includes the second-reagent aspiration position. Also, the rotational trajectory of the second-reagent dispensing probe 211 includes a second-reagent discharge position that is set for the second-reagent dispensing probe 211 to discharge the aspirated reagent to the reaction containers 2011. The second-reagent discharge position corresponds to the intersection between the rotational trajectory of the second-reagent dispensing probe 211 and the traveling path of the reaction containers 2011 held by the reaction disk 201.

The second-reagent dispensing probe 211 is driven by the drive mechanism 4 so that it ascends and descends at the second-reagent aspiration position or the second-reagent discharge position on the rotational trajectory. The second-reagent dispensing probe 211 aspirates the second reagent from the reagent container directly below it at the second-reagent aspiration position, under the control of the control circuitry 11. The second-reagent dispensing probe 211 is therefore one example of another aspirator according to the first embodiment. Also, the second-reagent dispensing probe 211 discharges the aspirated second reagent to the reaction container 2011 directly below it at the second-reagent discharge position, under the control of the control circuitry 11.

The stirring unit 212 is provided near the outer circumference of the reaction disk 201. The stirring unit 212 includes a stirring tool to stir the sample and the first reagent contained in the reaction container 2011, or the sample, the first reagent, and the second reagent contained in the reaction container 2011, at a stirring position on the reaction disk 201.

The photometry unit 213 optically measures given components in the mixture liquid of the sample and the reagent which were discharged into the reaction containers 2011. The photometry unit 213 includes a light source and a photodetector. Under the control of the control circuitry 11, the photometry unit 213 emits light from the light source. The emitted light enters the reaction container 2011 through a first sidewall, and exits the reaction container 2011 through a second sidewall that is opposite the first sidewall. The photometry unit 213 detects the light coming out of the reaction container 2011 by the photodetector.

More specifically, and for example, the photodetector detects the light having passed through the mixture liquid of the standard sample and the reagent in the reaction container 2011, and generates standard data represented as an absorbency level, etc., based on the intensity of the detected light. The photodetector also detects the light having passed through the mixture liquid of the subject sample and the reagent in the reaction container 2011, and generates subject data represented as an absorbency level, etc., based on the intensity of the detected light. The photometry unit 213 outputs these generated standard data and subject data to the analysis circuitry 3.

The washing unit 214 washes the inside of the reaction containers 2011 for which the measurement of the mixture liquid by the photometry unit 213 has been finished.

Turning to FIG. 1, the control circuitry 11 executes the operation programs stored in the storage circuitry 8 to realize functions corresponding to the operation programs. For example, the control circuitry 11 runs the operation programs to provide a system control function 111, an acquisition function 112, a switch control function 113, and a specifying function 114. Note that the first embodiment will be described assuming that a single processor realizes the system control function 111, the acquisition function 112, the switch control function 113, and the specifying function 114. However, the first embodiment is not limited to such a configuration. For example, multiple independent processors may be combined to form the control circuitry to have the respective processors run the operation programs, so that the system control function 111, the acquisition function 112, the switch control function 113, and the specifying function 114 will be realized.

The system control function 111 is a function to take total control over the components of the automatic analyzing apparatus 1, based on the input information input via the input interface 5.

The acquisition function 112 is a function to acquire the reagent information stored in the wireless tag 101 affixed to each reagent container 100. More specifically, the control circuitry 11 performs the acquisition function 112 according to given instructions. Examples of such given instructions include an instruction to start the measurement, an instruction to get the reagent information of the reagent container 100, and so on, input from an operator. With the acquisition function 112, the control circuitry 11 controls the RFID reader 9 and receives the electric signals based on the radio waves sent from the wireless tags 101. Based on the electric signals, the control circuitry 11 acquires the reagent information of the reagent containers 100 located in the first-reagent depository 204 or the second-reagent depository 205, or both of them.

The switch control function 113 is a function to control the wireless tag 101 affixed to the reagent container 100, to switch between activating and inactivating the response to the radio wave sent from the RFID reader 9. More specifically, and for example, the control circuitry 11 performs the switch control function 113 upon acquiring the reagent information of all the reagent containers 100 located in the first-reagent depository 204 or the second-reagent depository 205, or both of them, by the acquisition function 112. With the switch control function 113, the control circuitry 11 controls the emission circuitry 10 to start emission of the spot light to the wireless tag 101 affixed to the reagent container 100.

The control circuitry 11 stops the emission of the spot light when, for example, it is confirmed with the specifying function 114 that the response of the wireless tag 101 is in the inactivated state. Also, the control circuitry 11 may stop the emission of the spot light when a preset time period has passed in the absence of a notification from the specifying function 114.

The specifying function 114 is a function to specify which one of the multiple reagent containers 100 in the first-reagent depository 204 or the second-reagent depository 205, or in the first-reagent depository 204 and the second-reagent depository 205, the read reagent information belongs to. More specifically, and for example, the control circuitry 11 performs the specifying function 114 after the switch control function 113. With the specifying function 114, the control circuitry 11 checks the set of reagent information acquired before inactivating the response of the wireless tag 101, against the set of reagent information acquired after the inactivation. The control circuitry 11 specifies the reagent containers 100, to which the respective reagent information in the acquired set of reagent information belongs, by changing over the wireless tags 101 for response inactivation. The control circuitry 11, upon determining the reagent information corresponding to the reagent container 100, adds the specified stock location to the reagent information stored in the storage circuitry 8.

Next, where to dispose the RFID reader 9 and the emission circuitry 10 in the automatic analyzing apparatus 1 will be described with reference to FIG. 5. FIG. 5 schematically shows an example of the structure for a reagent container stock apparatus according to the first embodiment. For example, in the first embodiment, the reagent container stock apparatus is provided with the first-reagent depository 204 or the second-reagent depository 205, and includes the RFID reader 9, the emission circuitry 10, and the control circuitry 11. The reagent container stock apparatus may include both the first-reagent depository 204 and the second-reagent depository 205.

FIG. 5 assumes an instance where the RFID reader 9 wirelessly communicates with the wireless tags 101 affixed to the reagent containers 100 kept in the first-reagent depository 204. The first-reagent depository 204 and the second-reagent depository 205 are similar in structure, and therefore, the reagent container stock apparatus when provided additionally with the second-reagent depository 205 may have a structure similar to what is shown in FIG. 5.

In FIG. 5, the first-reagent depository 204 includes a reagent cover 2041, first reagent racks 2042, second reagent racks 2043, a housing 2044, a first disk 2045, a first guide 2046, a second disk 2047, a second guide 2048, and rollers 2049.

The housing 2044 opens at its upper end. The housing 2044 is formed into a shape that can accommodate the first reagent racks 2042, the second reagent racks 2043, the first disk 2045, the first guide 2046, the second disk 2047, the second guide 2048, the rollers 2049, and the emission circuitry 10. The opening of the housing 2044 is covered by the reagent cover 2041.

The interior portions of the housing 2044 are made of a material of good thermal conductivity, such as aluminum. Also, the housing 2044 includes an insulation portion of a thermally insulating material that envelops the interior portions of aluminum or the like.

The housing 2044 has a drain hole at the substantial center of its inner bottom face. The inner bottom face is formed to have a gentle slope declining from the inner circumferential face toward the drain hole. With this downslope extending from the inner circumferential face toward the drain hole, the inner bottom face can let water accumulated thereon (dew condensation water) move to the drain hole.

The housing 2044 includes multiple supports at the inner bottom face. The supports each have a shape capable of supporting the respective rollers 2049, while allowing the rotation of the rollers 2049. The supports are disposed at the positions of the inner bottom face of the housing 2044 so that the first guide 2046 and the second guide 2048 are placed on the supported rollers 2049.

The first disk 2045 has a doughnut shape with a round opening at the center. The surface of the first disk 2045 is provided with multiple attachment portions for attachment of the first reagent racks 2042.

The first reagent racks 2042 are each adapted to hold a predetermined number of the reagent containers 100 along the arc that complies with the outer diameter of the first disk 2045. The first reagent racks 2042 are detachably attached to the respective attachment portions provided on the surface of the first disk 2045. In the first-reagent depository 204, when the multiple first reagent racks 2042 each holding the multiple reagent containers 100 are attached, the reagent containers 100 form an annular arrangement that corresponds to the first disk 2045, accordingly.

The first guide 2046 is formed into a ring shape, and includes multiple teeth on its inner periphery. The upper surface of the first guide 2046 is fixed to the back side of the first disk 2045. The lower surface of the first guide 2046 is in contact with the rollers 2049 supported by the supports in the housing 2044. The teeth formed on the inner periphery of the first guide 2046 are engaged with a pinion gear provided at the rotary shaft of a first motor that constitutes one example of the drive mechanism 4. The rotation of the first motor causes the first guide 2046 and the first disk 2045 to turn via the pinion gear.

The second disk 2047 has a doughnut shape with a round opening at the center. This opening has a diameter that is to some extent larger than the first disk 2045. The second disk 2047 is disposed in proximity to the outer circumference of the first disk 2045. The surface of the second disk 2047 is provided with multiple attachment portions for attachment of the second reagent racks 2043.

The second reagent racks 2043 are each adapted to hold a predetermined number of the reagent containers 100 along the arc that complies with the outer diameter of the second disk 2047. The second reagent racks 2043 are detachably attached to the respective attachment portions provided on the surface of the second disk 2047. In the first-reagent depository 204, when the multiple second reagent racks 2043 each holding the multiple reagent containers 100 are attached, the reagent containers 100 form an annular arrangement that corresponds to the second disk 2047, accordingly.

The second guide 2048 is formed into a ring shape, and includes multiple teeth on its inner periphery. The upper surface of the second guide 2048 is fixed to the back side of the second disk 2047. The lower surface of the second guide 2048 is in contact with the rollers 2049 supported by the supports in the housing 2044. The teeth formed on the inner periphery of the second guide 2048 are engaged with a pinion gear provided at the rotary shaft of a second motor that constitutes one example of the drive mechanism 4. The rotation of the second motor causes the second guide 2048 and the second disk 2047 to turn via the pinion gear.

The RFID reader 9 is installed at a position that enables it to radiate the radio wave toward the wireless tags 101 affixed to the reagent containers 100. FIG. 5 shows an example where the RFID reader 9 is provided outside the first-reagent depository 204, i.e., across the side wall of the housing 2044 of the first-reagent depository 204.

The RFID reader 9 spreads out the radio wave in the form of, for example, a fan so that the radio wave can encompass the wireless tags 101 affixed to the multiple reagent containers 100 refrigerated in the first-reagent depository 204. In this instance, the intensity of the radio wave output by the RFID reader 9 is adjusted at, for example, a level that allows the radio wave to reach all the reagent containers 100 within the first-reagent depository 204 from the outside across the side wall of the housing 2044.

The broken lines given in FIG. 5 as well as FIG. schematically express the radio wave sent from the RFID reader 9. The RFID reader 9 simultaneously receives return radio waves from the wireless tags 101 affixed to all the reagent containers 100 located within the range of the sent radio wave.

The emission circuitry 10 is provided at a position that enables it to emit the spot light to each wireless tag 101 affixed to the reagent container 100. In the example shown in FIG. 5, the emission circuitry 10 is provided in the first-reagent depository 204, i.e., on the inner face of the side wall of the housing 2044 and at the height where the emission circuitry 10 substantially faces the wireless tags 101 affixed to the reagent containers 100. The emission circuitry 10 to provide in the first-reagent depository 204 may be a single unit. Or, more than one emission circuitry 10 may be provided in the first-reagent depository 204. Assuming that there are more than one emission circuitry 10 in the first-reagent depository 204, the control circuitry 11 knows where in the first-reagent depository 204 each emission circuitry 10 is provided.

While the emission circuitry 10 is preferably disposed inside the first-reagent depository 204, it may also be arranged outside the first-reagent depository 204. In this case, the housing 2044 has a window on its side face, in order to allow the spot light to transmit from the outside to the inside of the first-reagent depository 204.

Note that the positions of the RFID reader 9 and the emission circuitry 10 are not limited to the example shown in FIG. 5. If the wireless tags 101 are affixed to the top faces of the reagent containers 100, the RFID reader 9 and the emission circuitry 10 may be arranged as shown in FIG. 7. According to FIG. 7, the RFID reader 9 is provided outside the first-reagent depository 204, i.e., across the reagent cover 2041 of the first-reagent depository 204. In this case, the intensity of the radio wave output by the RFID reader 9 is adjusted at, for example, a level that allows the radio wave to reach all the reagent containers 100 within the first-reagent depository 204 from the outside across the reagent cover 2041.

In FIG. 7, the emission circuitry 10 is provided at a position on the inner face of the reagent cover 2041 of the first-reagent depository 204, where the emission circuitry 10 substantially faces the wireless tags 101 affixed to the reagent containers 100. This example requires at least one emission circuitry 10 to be provided for each of the group of reagent containers supported by the first disk 2045 and the group of reagent containers supported by the second disk 2047.

Note that FIGS. 5 and 7 are set forth for describing the examples where the RFID reader 9 radiates the radio wave to the wireless tags 101 affixed to the reagent containers 100 in the first-reagent depository 204. However, the RFID reader 9 may radiate the radio wave toward both the wireless tags 101 affixed to the reagent containers 100 in the first-reagent depository 204, and the wireless tags 101 affixed to the reagent containers 100 in the second-reagent depository 205.

Next, the operations of the automatic analyzing apparatus 1 designed as above will be described in accordance with the processing steps of the control circuitry 11.

Figure 8:
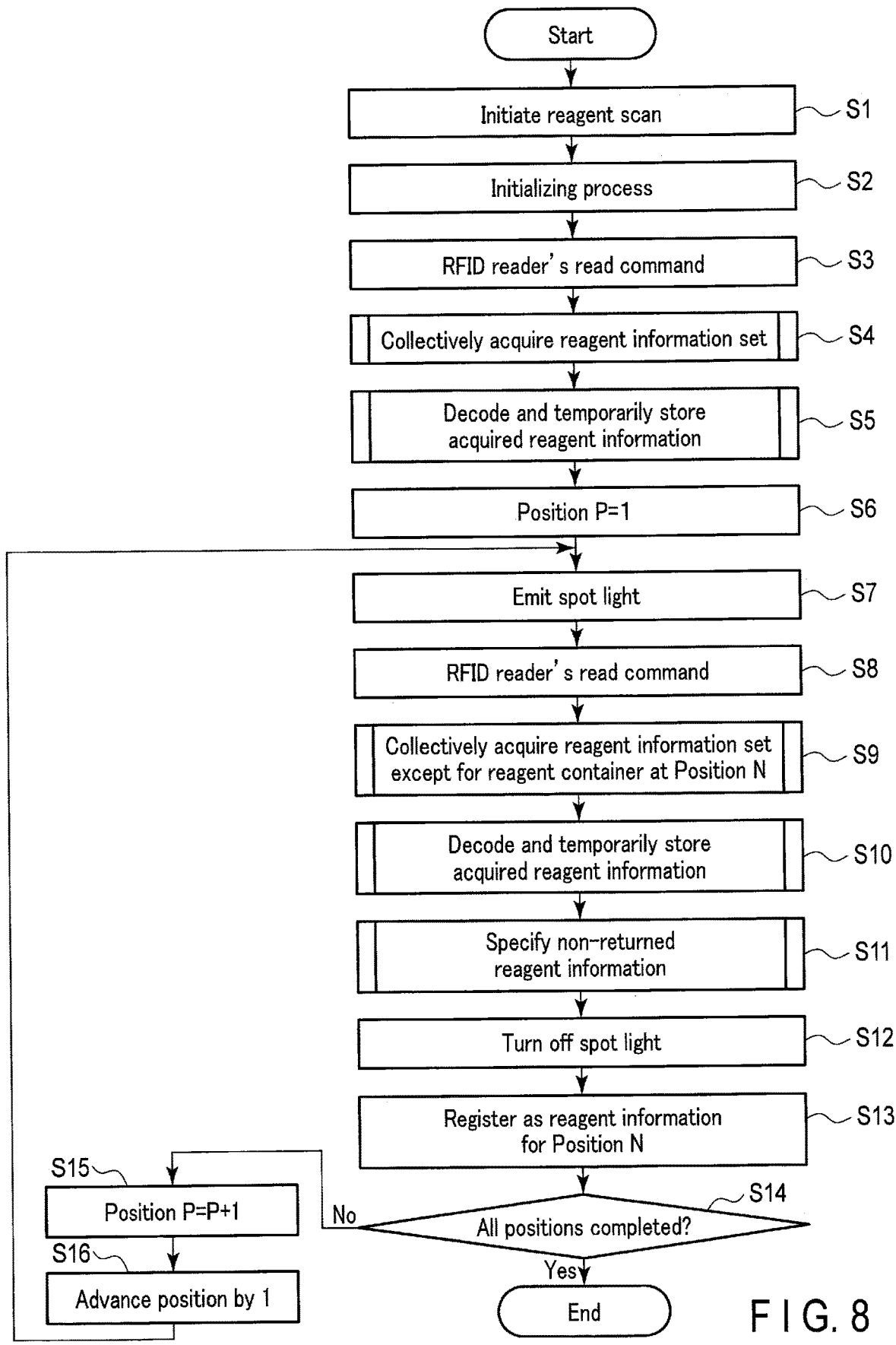
FIG. 8 is a flowchart showing processing steps for the control circuitry of FIG. 1, for specify reagent information corresponding to reagent containers.

FIG. 8 is a flowchart showing, as one example, the processing steps for the control circuitry 11 of FIG. 1 to specify the reagent information corresponding to the reagent container 100 in the first-reagent depository 204. The description for FIG. 8 will assume an instance where the RFID reader 9 and the emission circuitry 10 are arranged as shown in FIG. 5. Nevertheless, irrespective of the arrangements of the RFID reader 9 and the emission circuitry 10 in the automatic analyzing apparatus 1, the similar processing may be performed for specifying the reagent information corresponding to the reagent container 100.

First, responsive to an operator's pressing a measurement start button provided on the automatic analyzing apparatus 1, the control circuitry 11 performs the acquisition function 112 prior to the measurement. The control circuitry 11 accordingly initiates a reagent scan (step S1).

In this relation, once the reagent information corresponding to the reagent containers 100 in the first-reagent depository 204 is specified, the information would not be changed unless any of the reagent containers 100 are removed, etc. Thus, the control circuitry 11 may perform the acquisition function 112 responsive to the operator's pressing the measurement start button, and also according to if the reagent containers 100 have been intact up to this button press since the reagent information corresponding to the reagent containers 100 was specified previously. Whether or not the reagent containers 100 have been accessed during the period between the previous specifying event of the reagent information corresponding to the reagent containers 100 and the pressing of the measurement start button may be determined based on, for example, the opening and closing record of the reagent cover 2041.

With the acquisition function 112, the control circuitry 11 initializes the operation state of the first-reagent depository 204 (step S2). Initializing the operation state of the first-reagent depository 204 may be, for example, moving the first disk 2045 and the second disk 2047 of the first-reagent depository 204 to their initial positions. Subsequently, the control circuitry 11 controls the RFID reader 9 to radiate the radio wave of a preset frequency (step S3). The radio wave from the RFID reader 9 serves as a first RFID reader's read command related to the wireless tags 101 affixed to the reagent containers 100 in the first-reagent depository 204.

Upon receipt of the radio wave from the RFID reader 9, the wireless tags 101 operate using the received radio wave as an energy source. The radio wave from the RFID reader 9 is partly reflected by each wireless tag 101 and sent out as a radio wave from the antenna circuitry 1014. The radio wave from the antenna circuitry 1014 carries the reagent information stored in the storage circuitry 1012.

Figure 6:
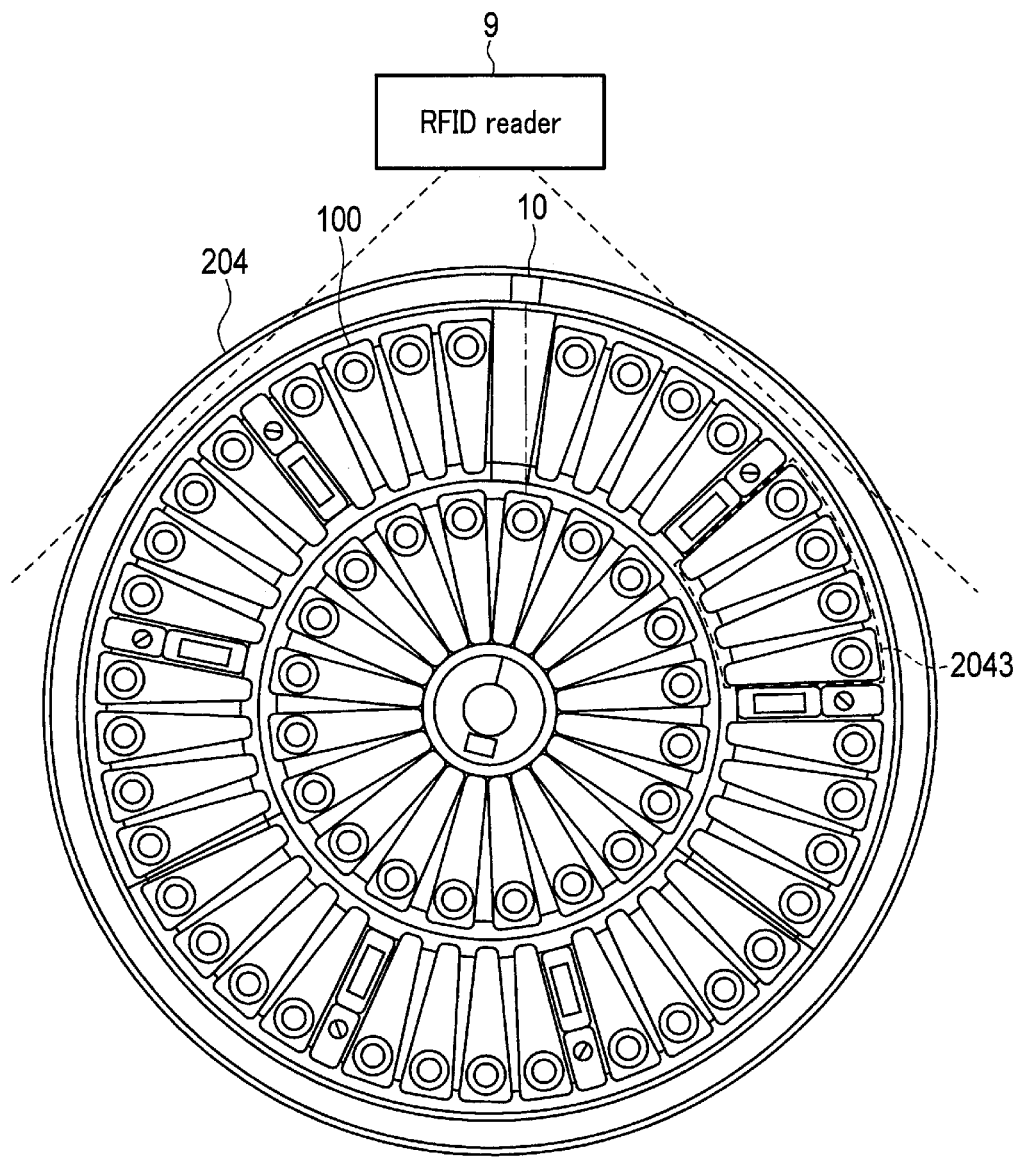
FIG. 6 is an overhead view of one design for the reagent container stock apparatus of FIG. 5.

With the acquisition function 112, the control circuitry 11 receives electric signals based on the radio waves sent from the wireless tags 101. The control circuitry 11 acquires the reagent information by decoding the received electric signals with reference to, for example, a conversion table that associates predetermined codes with various types of information (step S4). This enables collectively acquiring the set of reagent information of the reagent containers 100 in the first-reagent depository 204. For example, assuming an instance where the first-reagent depository 204 keeps the reagent containers 100 as shown in FIG. 6, the control circuitry 11 acquires the reagent information of each of the 56 reagent containers 100. The control circuitry 11 causes the storage circuitry 8 to store the acquired reagent information (step S5).

It has not yet been done at the stage of step S5 to know where in the first-reagent depository 204 each of the reagent containers is located. However, the reagent information of all the reagent containers 100 in the first-reagent depository 204 has been stored in the storage circuitry 8. Also, at the stage of step S5, the similar processing has allowed the storage circuitry 8 to store the reagent information of all the reagent containers in the second-reagent depository 205. Here, the control circuitry 11 recognizes a reagent that will be used in the succeeding measurement, based on the test order stored in the storage circuitry 8. The control circuitry 11 may verify the recognized reagent with the reagent information stored in step S5 to check whether or not there is a shortage of the reagent for use, whether or not the validity period of the reagent for use is expired, and so on. If it is found that there is a shortage of the reagent, the reagent is expired, or the like, the control circuitry 11 provides such information to the operator via the output interface 6. This enables the operator to promptly address the shortage, expiration, etc., of the reagents.

Then, the control circuitry 11 performs the switch control function 113. With the switch control function 113, the control circuitry 11 initializes a position indicator (P=1), i.e., sets Position 1 (step S6). Thus, the position facing the emission circuitry 10 will be referred to as the Position 1. The control circuitry 11 controls the emission circuitry 10 to start emission of the spot light to the wireless tag 101 affixed to the reagent container 100 that is staying at the Position 1 (step S7).

Upon irradiation with the spot light, the receive circuitry 1011 in the wireless tag 101 senses the spot light and produces an electric signal. The produced electric signal is output to the switch circuitry 1013 in the wireless tag 101. Taking the received electric signal as a trigger, the switch circuitry 1013 performs, for example, blocking the signal transmission path within the wireless tag 101. Thereby, the response in the form of a radio wave from this wireless tag 101 is inactivated.

With the acquisition function 112, the control circuitry 11 controls the RFID reader 9 to radiate the radio wave of a preset frequency (step S8). This radio wave from the RFID reader 9 serves as a second RFID reader's read command related to the wireless tags 101 affixed to the reagent containers 100 in the first-reagent depository 204. In the meantime, the wireless tag 101 irradiated with the spot light in step S7 remains irradiated with the spot light.

The wireless tags 101, other than the one being irradiated with the spot light, use part of the radio wave from the RFID reader 9 and each send out a radio wave carrying the reagent information stored in the storage circuitry 1012.

With the acquisition function 112, the control circuitry 11 receives electric signals based on the radio waves sent from the wireless tags 101. The control circuitry 11 decodes the received electric signals to acquire the reagent information (step S9). This enables collectively acquiring the set of reagent information of the reagent containers 100 which are not being irradiated with the spot light, among the reagent containers 100 in the first-reagent depository 204. For example, in the instance where the first-reagent depository 204 keeps the reagent containers 100 as shown in FIG. 6, the control circuitry 11 acquires the reagent information of each of the 55 reagent containers 100. The control circuitry 11 causes the storage circuitry 8 to store the acquired reagent information (step S10).

The control circuitry 11 then performs the specifying function 114. With the specifying function 114, the control circuitry 11 specifies the reagent information corresponding to the reagent containers 100 kept in the first-reagent depository 204. More specifically, the control circuitry 11 checks the reagent information set stored in the storage circuitry 8 in step S10 against the reagent information set stored in the storage circuitry 8 in step S5. The control circuitry 11 specifies the reagent information that is included in the reagent information set stored in step S5 but not in the reagent information set stored in step S10, as the reagent information of the reagent container 100 staying at the Position 1 (step S11). As a result, the reagent information corresponding to the reagent container 100 staying at the Position 1 is specified. This can also mean that the control circuitry 11 determines that this specific reagent container 100 is held at the Position 1.

Upon specifying the reagent information corresponding to the reagent container 100, the control circuitry 11 controls the emission circuitry 10 to stop the emission of the spot light (step S12). The control circuitry 11 causes the storage circuitry 8 to duly store the reagent information associated with the reagent container 100 staying at the Position 1, as the reagent information for the Position 1 (step S13). This can also mean that the storage circuitry 8 stores information indicating that the specific reagent container 100 is held at the Position 1. The reagent information duly stored in association with its position is read from the storage circuitry 8 for use at the time of the measurement.

Subsequently, the control circuitry 11 determines whether or not the last position, i.e., Position 56, has been reached (step S14). If it is determined that the Position 56 has not been reached (No in step S14), the control circuitry 11 increments the position indicator by one (P=P+1) (step S15). After incrementing the position indicator, the control circuitry 11 moves at least the first disk 2045 or the second disk 2047 of the first-reagent depository 204 (step S16) so that the next reagent container 100 is shifted to the position facing the emission circuitry 10.

Now, for the second loop, the spot light is emitted to the wireless tag 101 affixed to the reagent container 100 staying at the Position 2 (step S7). The control circuitry 11 then utilizes the RFID reader 9 to acquire the reagent information of the reagent containers 100 other than the one staying at the Position 2 (step S9), and causes the storage circuitry 8 to store the acquired reagent information set (step S10). The control circuitry 11 specifies the reagent information corresponding to the reagent container 100 staying at the Position 2 by checking the reagent information sets stored before and during the emission of the spot light against one another (step S11). This can also mean that the control circuitry 11 determines that this reagent container 100 is held at the Position 2. The reagent information associated with the reagent container 100 staying at the Position 2 is duly stored in the storage circuitry 8, as the reagent information for the Position 2 (step S13). It can also be said that the storage circuitry 8 stores information indicating that this specific reagent container 100 is held at the Position 2.

Additionally, for the wireless tags 101 affixed to the reagent containers 100 that form the inner annular arrangement in the first-reagent depository 204, the emission of the spot light is performed, for example, in the following manner. As shown in, for example, FIG. 6, when a predetermined number of the second reagent racks 2043 are attached in the first-reagent depository 204, a gap having a width of about one reagent container 100 is formed in the outer annular arrangement of the reagent containers 100. The emission circuitry 10 emits the spot light to each wireless tag 101 affixed to the reagent container 100 forming the inner annular arrangement, through this gap as shown by the dashed-dotted line in FIG. 6.

The control circuitry 11 repeats the processing from step S7 to step S16 until the Position 56 is reached. In step S14, if it is determined that the Position 56 has been reached, the control circuitry 11 terminates the processing.

In the first embodiment as described, the wireless tag 101 that changes the response state according to the receipt of the electromagnetic wave is affixed to each of the multiple reagent containers 100. The emission circuitry 10 switches the response state of one of the wireless tags 101 affixed to the reagent containers 100. Together, the RFID reader 9 is caused to send out a wide-coverage radio wave before and after the response state is changed, so that the set of reagent information stored in the wireless tags 101 affixed to the reagent containers 100 is acquired at each timing. Thus, the reagent container stock apparatus according to the first embodiment can acquire reagent information sets differing between the timing before the emission of the electromagnetic wave and the timing after the change of the response state due to the emission of the electromagnetic wave.

Also, according to the first embodiment, the control circuitry 11 with the acquisition function 112 controls the RFID reader 9 so that the set of reagent information stored in the wireless tags 101 affixed to the reagent containers 100 is acquired at each of the timing before switching the response state of the wireless tag 101 and the timing after switching the response state. The control circuitry 11 with the specifying function 114 then associates the set of read reagent information with the reagent containers 100 based on the reagent information set acquired at the timing before switching the response state of the wireless tag 101 and the reagent information set acquired at the timing after switching the response state. This enables the automatic analyzing apparatus 1 according to the first embodiment to associate, as a logical outcome, all the reagent containers 100 in the first-reagent depository 204 and the second-reagent depository 205 with the respective reagent information read from their wireless tags 101.

Therefore, with the reagent container stock apparatus and the automatic analyzing apparatus 1 according to the first embodiment, it is possible to read the information stored in the wireless tags of the reagent containers kept in the reagent depositories, while specifying which reagent container each information belongs to.

Also, with the automatic analyzing apparatus 1 according to the first embodiment, it is possible to associate the reagent information with the position of its corresponding reagent container in the reagent depositories, while securing the merits of the wireless tag technologies. As such, with the automatic analyzing apparatus 1 according to the first embodiment, it is possible to utilize the RFID system for also the management of the reagents in the reagent depositories, in addition to the reagents' inventory control. That is, advantages of the wireless tag technologies, such as the capability of storing a great amount of information, the capability of writing additional information, and the capability of collectively reading bulk data at once, can be enjoyed throughout the test procedures.

When the automatic analyzing apparatus 1 is furnished with an RFID writer, a configuration to cause this RFID writer to write, for example, information indicative of the time (date and hour) of the start of use of the reagents into the respective wireless tags 101 may also be possible. Such a configuration allows the start time and date to be read from the wireless tags 101, and to be applied to the determination of whether or not the succeeding use would fall within the validity period. Also, a configuration to cause the RFID writer to write, for example, the information indicative of the number of times of the reagents' use into the respective wireless tags 101 may be possible. This configuration allows the number of times of use to be read from the wireless tags 101, and to be applied to the comprehension of the remaining amounts of the reagents.

Furthermore, since the information of the reagent containers 100 is maintained in the wireless tags 101, the automatic analyzing apparatus 1 can properly manage the reagent containers 100 even in the instances where any of the reagent containers 100 have been temporarily taken out from the automatic analyzing apparatus 1 and then placed back again. Also, in the event that the placed reagent containers 100 involve wrong containers which were taken out from other automatic analyzing apparatuses, the automatic analyzing apparatus 1 can instantly identify the wrong containers.

In view of these, it is possible to realize a reagent container stock apparatus, an automatic analyzing apparatus, and a specifying method, with which the reagent information stored in the wireless tags can be accurately identified and managed for each one of the reagent containers, in the context of the technologies of an RFID system.

As such, with the automatic analyzing apparatus 1, operations with the reagent containers 100 can proceed only by having the wireless tags affixed to the reagent containers 100, without employing barcode labels. Also, since particulars about the reagent containers placed on the automatic analyzing apparatus 1 can be collectively comprehended, the inventory control will be facilitated for the entire work in the test room. The side face of the reagent depository is not required to have a scanning window for reading barcodes, either. Naturally, the occurrence of barcode read errors, etc., due to dew formation or the like on the surface of the scanning window, can be eliminated.

In the conventional operations, it was a requisite to fix a certain length of period for a barcode reader to accurately read each barcode. There was therefore a disadvantage that the operations would consume more time than necessary, in the cases of dealing with missing reagent containers, etc. According to the first embodiment, the emission circuitry 10 emits the electromagnetic wave so that the absence of a reagent container, if it is indeed involved, can be immediately recognized. Consequently, this leads to fast acquisition of the sets of reagent information of the reagent containers.

Note that the first embodiment has been described using the examples where the wireless tags 101 inactivate the response state by the switch circuitry 1013, upon receipt of the spot light at the receive circuitry 1011. However, this is not a limitation. For example, the switch circuitry 1013 may modulate the electric signal that constitutes the reagent information, based on an amplitude of the electric signal output from the receive circuitry 1011. The antenna circuitry 1014 then sends out the radio wave that carries the reagent information and that has been modulated based on the intensity of the electric signal output from the receive circuitry 1011. In this manner, after the receive circuitry 1011 senses the light, the wireless tag 101 returns the radio wave encoding the intensity of the received light, to the RFID reader 9.

The wireless tags 101 affixed to the respective reagent containers 100 in the first-reagent depository 204 or the second-reagent depository 205, or in the first-reagent depository 204 and the second-reagent depository 205, each send out the radio wave modulated based on the intensity of the received light to the RFID reader 9. The control circuitry 11 further includes a decoding function to acquire the intensity of the received light, which was encoded in the radio wave through the modulation, by subjecting the received radio wave to decoding processing.

The control circuitry 11 with the specifying function 114 then compares the intensity values of the received light, acquired by the decoding function for the respective received radio waves, with one another. The control circuitry 11 may determine that the radio wave showing a particularly large intensity value of the received light has been sent from the wireless tag 101 being irradiated with the spot light. The control circuitry 11 associates the radio wave, which encodes a large intensity of the received light by the modulation, with the reagent container 100 irradiated with the spot light, while sequentially changing over the reagent containers 100 targeted for the spot light emission. Accordingly, the control circuitry 11 can associate the reagent information of the reagent containers 100 with the positions where the reagent containers 100 are kept, respectively.

The examples of the first embodiment above have utilized the changes of the response, such as switching the activation and inactivation states of the response, and modulating the response based on the intensity of the received light. The technique to modify the response is not limited to them. It is also possible to change the period or the repeating number of the response, or to use a different frame format, etc., as long as the specifications of the RFID system permit.

In the instance where the emission of the spot light does not produce a radio wave showing an increased intensity of the received light, the control circuitry 11 may determine that no reagent container 100 is kept at the position under the spot light emission, that is, this position is vacant.

The first embodiment has been described using the examples where the control circuitry 11 of the automatic analyzing apparatus 1 specifies the reagent information of the reagent container 100 staying at a given position, and causes the storage circuitry 8 to store this reagent information in association with the position. This is not a limitation. When the automatic analyzing apparatus 1 is furnished with an RFID writer, the control circuitry 11 may perform a write function to write the position information into the reagent information stored in the wireless tags 101.

The first embodiment has been described also using the examples where the reagent information corresponding to the reagent containers 100 is specified prior to the start of measurement. However, this is not a limitation, either. For example, it is also possible to specify the reagent information corresponding to each reagent container 100 at the time of aspirating the reagents from the reagent containers 100.

More specifically, in the first-reagent depository 204, the emission circuitry 10 may be disposed at a position that enables it to emit the spot light to the wireless tag 101 of the reagent container 100 whose opening is set at the first-reagent aspiration position.

The control circuitry 11 has already caused the storage circuitry 8 to store the set of reagent information of the reagent containers 100 kept in the first-reagent depository 204, before the measurement, as in the manner of steps S1 to S5 in FIG. 8. The control circuitry 11 with the switch control function 113 controls the emission circuitry 10 to start emission of the spot light to the reagent container 100 whose opening has reached the first-reagent aspiration position.

Subsequently, the control circuitry 11 with the acquisition function 112 causes the RFID reader 9 to radiate the radio wave of a preset frequency so that the reagent information is acquired from the reagent containers 100 other than the one having its opening at the first-reagent aspiration position. The control circuitry 11 specifies the reagent information of the reagent container that is being subjected to aspiration, by comparing the acquired reagent information set with the already-stored reagent information set. The control circuitry 11 checks the specified reagent information with reference to the intended test item included in the test order to confirm whether or not the reagent that is about to use in the ongoing analysis is proper. Thus, the mismatch between the reagent to be actually aspirated and the reagent intended for use in the test item included in the test order can be prevented, and consequently, the preventive measure against test errors can be strengthened.

There are a reagent dispensing arm, etc., in the vicinity of the reagent aspiration position, so the space available for the device installation is limited. The emission circuitry 10 according to the embodiment is suited for downsizing, as it adopts an LED or the like as a light source. The wireless tags 101 can also be downsized. Thus, even in the narrow space such as the vicinity of the reagent aspiration position, the emission circuitry 10 and the wireless tags 101 can be arranged without hampering the operations or presence of the reagent dispensing arm, etc.

The examples of the first embodiment have been described assuming that the wireless tags 101 are each furnished with the receive circuitry 1011 adapted to sense the spot light to generate electric signals. This is not a limitation. The wireless tags 101 may each include, for example, a mechanical contact region instead of the receive circuitry 1011. In this instance, the inner side face of the reagent depository is provided with one or more conductive rod members 10a as the switcher, instead of the emission circuitry 10. The rod member 10a may be a probe or the like.

Figure 9:
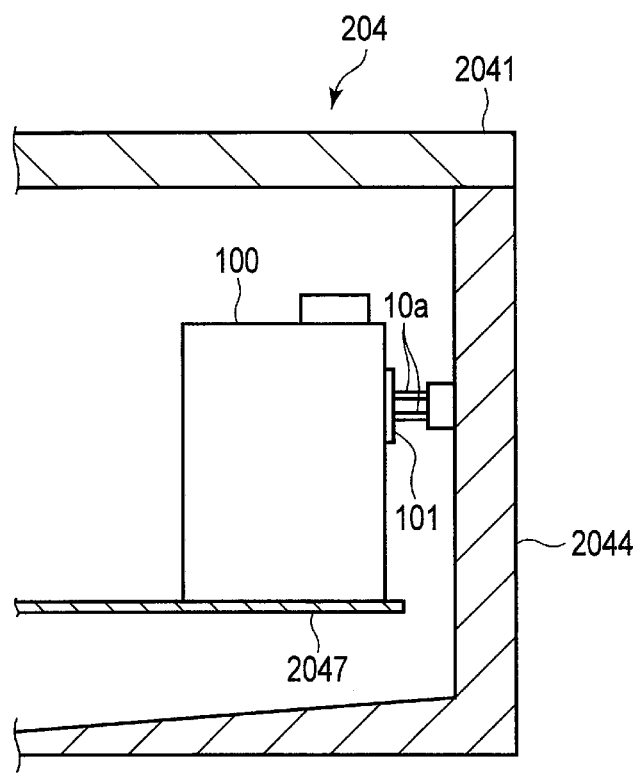
FIG. 9 is a diagram showing another inner structure for the reagent container stock apparatus of FIG. 5.

FIG. 9 schematically shows another example of the inner structure for the reagent container stock apparatus of FIG. 5. In the example shown in FIG. 9, the control circuitry 11 performs the switch function in response to the two rod members 10a touching the contact region provided on the wireless tag 101, and supplies an electric current to the wireless tag 101 using the rod members 10a. The electric current supplied using the rod members 10a serves as a trigger for the switch circuitry 1013 in the wireless tag 101 to inactivate the response to the radio wave. The control circuitry 11 stops supplying the electric current when, for example, it is confirmed by the specifying function 114 that the response of the wireless tag 101 is in the inactivated state. Also, the control circuitry 11 may stop supplying the electric current when a preset time period has passed in the absence of a notification from the specifying function 114. The switch circuitry 1013 activates the response to the radio wave when the supply of the electric current via the rod members 10a is stopped.

In place of or in addition to the emission circuitry 10, the control of the wireless tags 101 may also refer to the presence or absence (or the intensity) of magnetic force (e.g., with a Hall sensor), whether or not the conduction by mechanical contact has occurred, and so on.

Second Embodiment

The above descriptions of the first embodiment have assumed the instances of specifying the reagent information of the reagent containers 100 kept in the first-reagent depository 204 and the second-reagent depository 205. Beyond these, the disclosed art to specify the reagent information of multiple reagent containers 100 through the use of the wireless tags 101 are even effective in the instances of loading the reagent containers 100 into the first-reagent depository 204 and the second-reagent depository 205.

For example, when one or more reagent containers 100 kept in the first-reagent depository 204 or the second-reagent depository 205 have decreased the remaining amount of reagent, or when the reagent contained in any of the reagent containers 100 is expired, such reagent containers 100 need to be replaced. The second embodiment will assume the instances where the automatic analyzing apparatus includes a reagent container load system, and replaces the reagent containers 100 kept in the first-reagent depository 204 and the second-reagent depository 205 with new reagent containers 100 by operating this reagent container load system.

Figure 10:
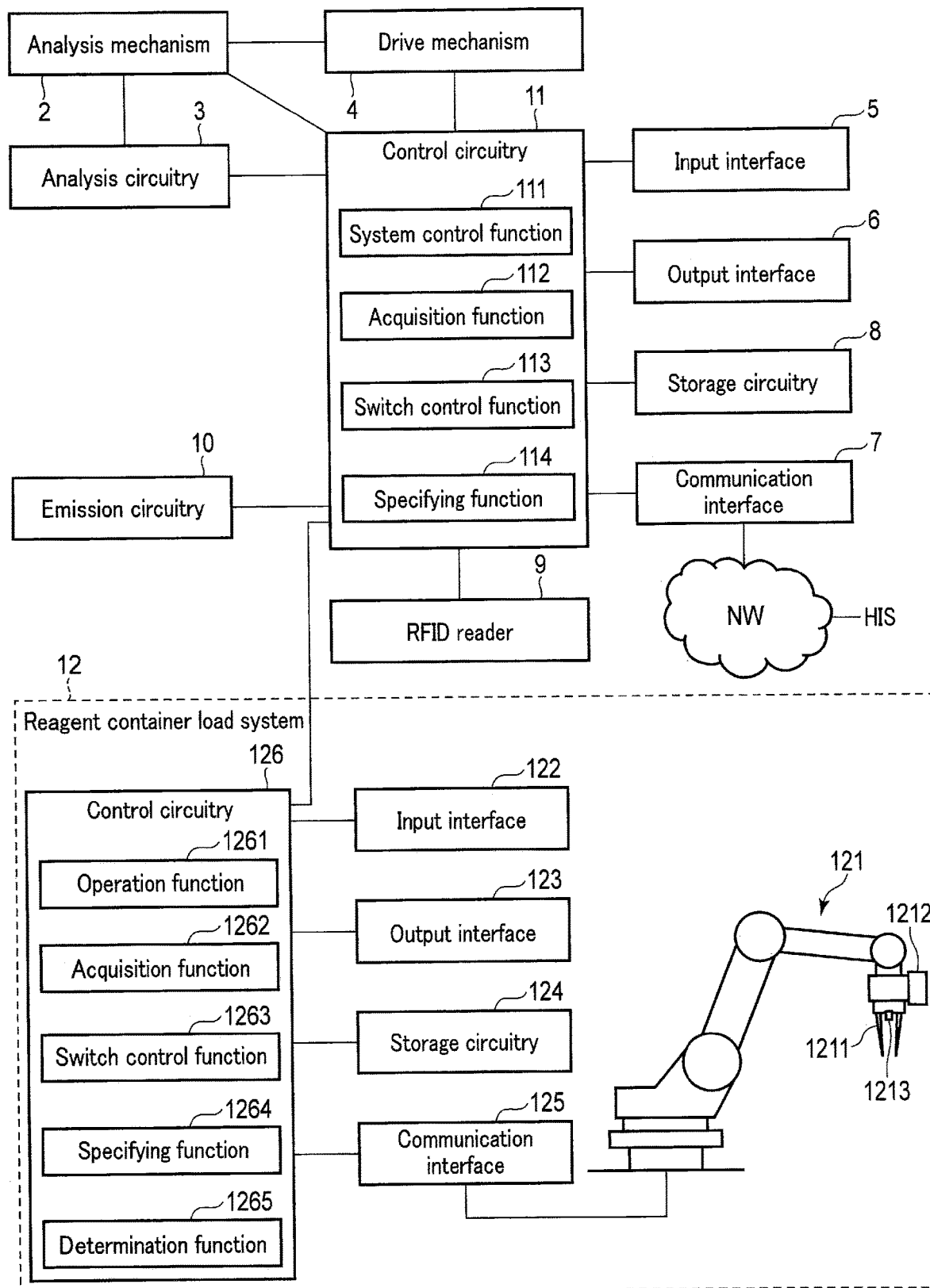
FIG. 10 is a block diagram showing one functional configuration for an automatic analyzing apparatus according to a second embodiment.

FIG. 10 is a block diagram showing an exemplary functional configuration for an automatic analyzing apparatus 1A according to the second embodiment. In FIG. 10, the automatic analyzing apparatus 1A includes a reagent container load system 12. The reagent container load system 12 includes a robot arm 121, an input interface 122, an output interface 123, storage circuitry 124, a communication interface 125, and control circuitry 126.

The input interface 122 accepts, for example, inputs of instructions for the reagent container load system 12, from an operator. The input interface 122 may be realized by a mouse, a keyboard, a touch pad which receives input instructions through contact of its operation screen, or the like. The input interface 122 is connected to the control circuitry 126 so that it converts operational instructions input by an operator into electric signals and outputs them to the control circuitry 126. The input interface 122 and the input interface 5 may be provided as an integrated interface.

The output interface 123 is connected to, for example, the control circuitry 126 and outputs the signals coming from the control circuitry 126. The output interface 123 is realized by, for example, display circuitry, print circuitry, audio device, or the like. The output interface 123 and the output interface 6 may be provided as an integrated interface.

The storage circuitry 124 may be, for example, a processor-readable storage medium, such as a magnetic or optical storage medium or a semiconductor memory. It is not a requisite to realize the storage circuitry 124 by a single storage medium. For example, the storage circuitry 124 may be realized by multiple storage media.

The storage circuitry 124 stores operation programs for realizing functions of the control circuitry 126. The storage circuitry 124 further stores reagent information read from the wireless tags 101 affixed to the respective reagent containers 100 placed on a reagent tray 127. Also, the storage circuitry 124 acquires the reagent information of the replacement target reagent container 100, which is associated with its position in the first-reagent depository 204 or the second-reagent depository 205, from the storage circuitry 8 via the control circuitry 126. The storage circuitry 124 stores the reagent information acquired from the storage circuitry 8.

The communication interface 125 is connected to, for example, the robot arm 121. The communication interface 125 performs data communication with the robot arm 121. For example, the communication interface 125 outputs control signals from the control circuitry 126 to the robot arm 121. The communication interface 125 also receives signals from the robot arm 121 and outputs them to the control circuitry 126.

Figure 11:
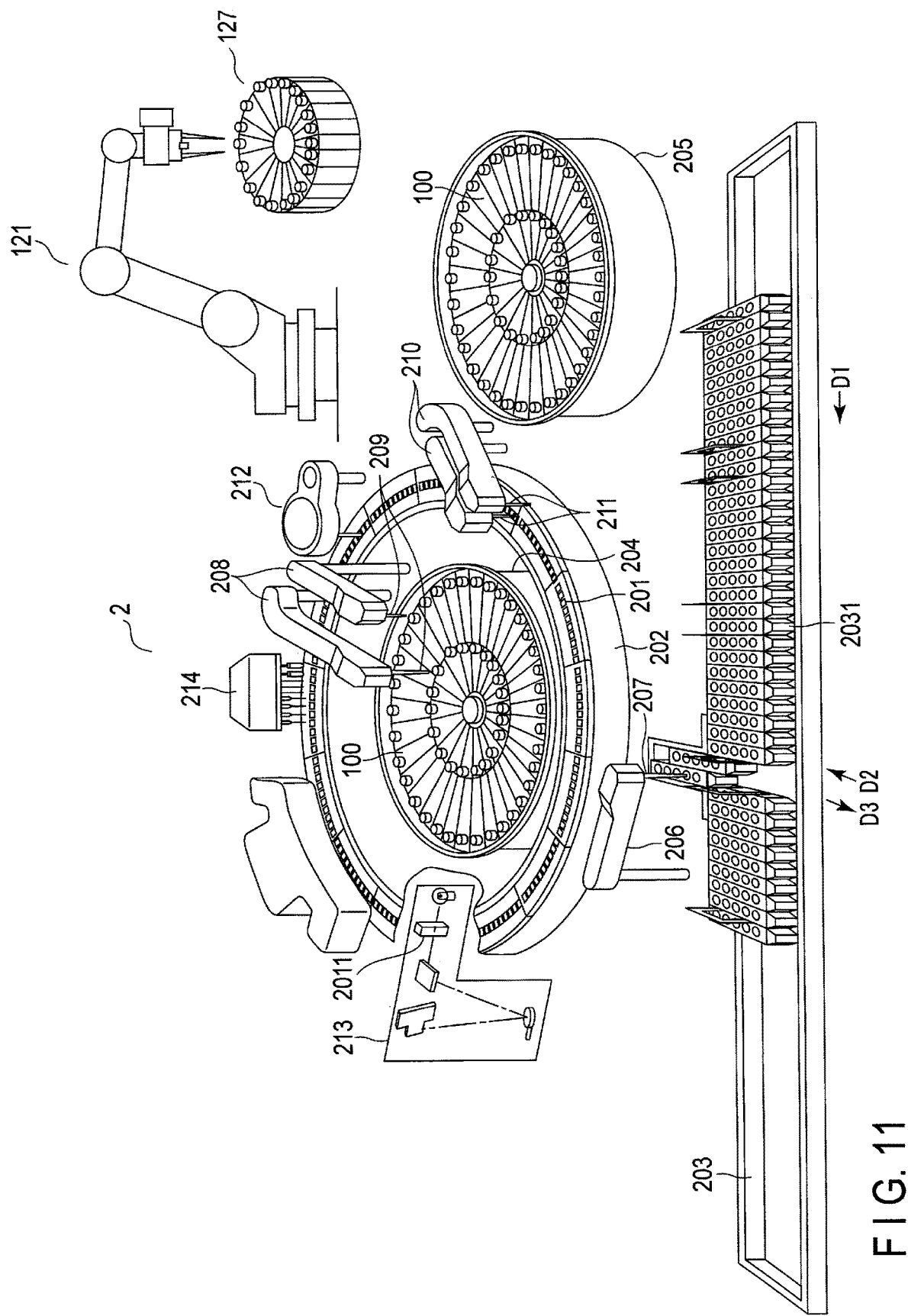
FIG. 11 is a diagram showing an example of the analysis mechanism of FIG. 10 provided with a robot arm.

The robot arm 121 is one example of a loader that loads the reagent containers 100 into the first-reagent depository 204 and the second-reagent depository 205. FIG. 11 schematically shows an example where the robot arm 121 is provided for the analysis mechanism 2 of FIG. 10. As in FIG. 11, the robot arm 121 is provided at, for example, a position that enables it to access the first-reagent depository 204 and the second-reagent depository 205. Also, the reagent tray 127 is provided for the automatic analyzing apparatus 1A. The reagent tray 127 serves as, for example, a reagent retaining space where multiple substituting reagent containers 100 taken out of a refrigerator are placed.

The robot arm 121 includes, for example, a holder 1211 and a number of movable parts. The holder 1211 includes, for example, nails or the like for holding the reagent container 100. The holder 1211 performs, for example, opening and closing motions under the control of the control circuitry 126. By the closing motion to close the nails or the like, the holder 1211 holds the reagent container 100. Also, by the opening motion to open the nails or the like, the holder 1211 releases the reagent container 100 having been held. The movable parts are driven by, for example, multiple servo motors. Under the control of the control circuitry 126, the movable parts move the holder 1211, etc., to desired positions.

The robot arm 121 also includes an RFID reader 1212 and emission circuitry 1213. The RFID reader 1212 is arranged at a position that allows wireless communications with, for example, the wireless tags 101 affixed to the reagent containers 100 present on the reagent tray 127. The RFID reader 1212 reads the reagent information stored in the wireless tags 101 affixed to the respective reagent containers 100 on the reagent tray 127, under the control of the control circuitry 126. More specifically, the RFID reader 1212 is controlled by the control circuitry 126 to radiate a radio wave of a preset frequency toward the reagent tray 127. That is, the RFID reader 1212 operates as one example of a wave radiator. The RFID reader 1212 then receives radio waves that are returned from the wireless tags 101 according to the sent radio wave. The RFID reader 1212 thus also operates as one example of a wave receiver. The RFID reader 1212 converts the received radio waves into electric signals, and outputs the electric signals to the control circuitry 126.

The emission circuitry 1213 is one example of a switcher for switching the response states of the wireless tags 101. Under the control of the control circuitry 126, the emission circuitry 1213 emits an electromagnetic wave of a preset frequency. Here, the emission circuitry 1213 is given an adjusted directivity so that the electromagnetic wave can be emitted to only the wireless tag 101 affixed to one of the multiple reagent containers 100 on the reagent tray 127. The preset frequency is higher than that of the radio wave used for wireless communications between the RFID reader 1212 and the wireless tags 101. The emission circuitry 1213 is arranged at a position that faces the reagent container 100 when the holder 1211 approaches the reagent container 100, e.g., at the forefront of the holder 1211.

The second embodiment will be described assuming the instances where the emission circuitry 1213 emits light as the electromagnetic wave. The light emitted by the emission circuitry 1213 may be any type of light, including infrared light, visible light, and so on. The emission circuitry 1213 includes, for example, a light-emitting diode, a semiconductor laser, a light source lamp, or the like. For example, the emission circuitry 1213 drives the light-emitting diode, the semiconductor laser, the light source lamp, or the like to emit spot light of a given diameter to the wireless tag 101, under the control of the control circuitry 126.

The control circuitry 126 is a processor functioning as a center of the reagent container load system 12, and is one example of processing circuitry. The control circuitry 126 executes the operation programs stored in the storage circuitry 124 to realize functions corresponding to the operation programs. The control circuitry 126 may be provided with a storage area to store at least part of the data stored in the storage circuitry 124.

For example, the control circuitry 126 runs the operation programs to provide an operation function 1261, an acquisition function 1262, a switch control function 1263, a specifying function 1264, and a determination function 1265. Note that the second embodiment will be described assuming that a single processor realizes the operation function 1261, the acquisition function 1262, the switch control function 1263, the specifying function 1264, and the determination function 1265. However, this is not a limitation. For example, multiple independent processors may be combined to form the control circuitry to have the respective processors run the operation programs, so that the operation function 1261, the acquisition function 1262, the switch control function 1263, the specifying function 1264, and the determination function 1265 will be realized.

The operation function 1261 is a function to operate the robot arm 121.

The acquisition function 1262 is a function to acquire the reagent information stored in the wireless tag 101 affixed to each reagent container 100. More specifically, the control circuitry 126 performs the acquisition function 1262 according to given instructions. Examples of such given instructions include an instruction to start the replacement operation, input from an operator. With the acquisition function 1262, the control circuitry 126 controls the RFID reader 1212 and receives the electric signals based on the radio waves sent from the wireless tags 101. Then, based on the electric signals, the control circuitry 126 acquires the reagent information of the respective reagent containers 100 on the reagent tray 127.

The switch control function 1263 is a function to control the wireless tag 101 affixed to the reagent container 100, to switch between activating and inactivating the response to the radio wave sent from the RFID reader 1212. More specifically, and for example, the control circuitry 126 performs the switch control function 1263 upon the robot arm 121 reaching a predetermined position, under the condition that the reagent information of all the reagent containers 100 on the reagent tray 127 has been acquired. With the switch control function 1263, the control circuitry 261 controls the emission circuitry 1213 to start emission of the spot light to the wireless tag 101 affixed to the reagent container 100.

The control circuitry 126 stops emission of the spot light when, for example, it is confirmed by the specifying function 1264 that the response of this wireless tag 101 is in the inactivated state. Also, the control circuitry 126 may stop the emission of the spot light when a preset time period has passed in the absence of a notification from the specifying function 1264.

The specifying function 1264 is a function to specify which one of the multiple reagent containers 100 placed on the reagent tray 127, the read reagent information belongs to. More specifically, and for example, the control circuitry 126 performs the switch control function 1263 and thereafter the specifying function 1264. With the specifying function 1264, the control circuitry 126 checks the set of reagent information acquired before inactivating the response of the wireless tag 101, against the set of reagent information acquired after the inactivation. The specifying function 1264 specifies the reagent information that was stored before inactivating the response but that is not stored after the inactivation, as the reagent information of the reagent container 100 placed at a specific position on the reagent tray 127. Positions on the reagent tray 127 may be defined according to, for example, position information assigned in the reagent tray 127, pulse numbers that occur when controlling the servo motors of the robot arm 121, and so on.

The determination function 1265 is a function to determine whether or not the reagent container 100 corresponding to the specified reagent information is the one required. For example, with the determination function 1265, the control circuitry 126 determines whether or not the reagent container 100 corresponding to the specified reagent information is the required reagent container 100, by comparing the specified reagent information with the reagent information of the replacement target reagent container 100.

Next, exemplary operations for replacing the reagent containers 100, carried out by the reagent container load system 12 in the automatic analyzing apparatus 1A designed as above, will be described in accordance with the processing steps of the control circuitry 126. Note that the following description will assume the instance where the wireless tags 101 are affixed to the top faces of the respective reagent containers 100.

For example, when one or more reagent containers 100 kept in the first-reagent depository 204 or the second-reagent depository 205 have decreased the remaining amount of reagent, or when the reagent contained in any of the reagent containers 100 is expired, an operator makes arrangements for replacing the reagent containers 100. The operator takes out multiple reagent containers 100 including the required one or more reagent containers 100 from a refrigerator, and places the multiple reagent containers 100 on the reagent tray 127. After placing the reagent containers 100 on the reagent tray 127, the operator designates one or more reagent containers 100 kept in the first-reagent depository 204 or the second-reagent depository 205, which are the targets of replacement, via the input interface 122 of the reagent container load system 12. After designating one or more replacement target reagent containers 100, the operator inputs an instruction to start the replacement via the input interface 122.

Responsive to the input of the replacement start instruction, the control circuitry 126 reads, for example, the reagent information of each replacement target reagent container 100, which is associated with its position in the first-reagent depository 204 or the second-reagent depository 205, from the storage circuitry 8. The control circuitry 126 stores the read reagent information in the storage circuitry 124. After storing the reagent information of each replacement target reagent container 100 in the storage circuitry 124, the control circuitry 126 performs the operation function 1261. Meanwhile, when the replacement start instruction for the reagent containers 100 is input, the operation state of the first-reagent depository 204 and the second-reagent depository 205 is initialized.

With the operation function 1261, the control circuitry 126 moves the RFID reader 1212 provided at the robot arm 121 to the position where it can radiate the radio waves toward the wireless tags 101 affixed to the multiple reagent containers 100 on the reagent tray 127.

When the movement of the RFID reader 1212 is finished, the control circuitry 126 performs the acquisition function 1262. With the acquisition function 1262, the control circuitry 126 controls the RFID reader 1212 to radiate the radio wave of a preset frequency. The radio wave from the RFID reader 1212 serves as a first RFID reader's read command related to the wireless tags 101 affixed to the reagent containers 100 on the reagent tray 127.

Upon receipt of the radio wave from the RFID reader 1212, the wireless tags 101 each return a radio wave that carries the reagent information.

With the acquisition function 1262, the control circuitry 126 receives electric signals based on the radio waves sent from the wireless tags 101. The control circuitry 126 acquires the reagent information by decoding the received electric signals with reference to, for example, a conversion table that associates predetermined codes with various types of information. This enables collectively acquiring the set of reagent information of the reagent containers 100 on the reagent tray 127. The control circuitry 126 causes the storage circuitry 124 to store the acquired reagent information.

Once the acquired reagent information is stored in the storage circuitry 124, the control circuitry 126 performs the operation function 1261. With the operation function 1261, the control circuitry 126 moves the emission circuitry 1213 provided at the forefront of the holder 1211 of the robot arm 121 to the position above the reagent container 100 located at an initial position that is preset on the reagent tray 127.

When the emission circuitry 1213 reaches the position where it can emit the spot light to the wireless tag 101 affixed to the top face of the reagent container 100 located at the initial position, the control circuitry 126 performs the switch control function 1263. With the switch control function 1263, the control circuitry 126 controls the emission circuitry 1213 to start emission of the spot light to the wireless tag 101 affixed to the reagent container 100 located at the initial position.

When the wireless tag 101 is in receipt of the spot light from the emission circuitry 1213, the return radio wave from this wireless tag 101 is restrained.

After the emission of the spot light has started, the control circuitry 126 with the acquisition function 1262 controls the RFID reader 1212 to radiate the radio wave of a preset frequency. This radio wave from the RFID reader 1212 serves as a second RFID reader's read command related to the wireless tags 101 affixed to the reagent containers 100 on the reagent tray 127. In the meantime, the wireless tag 101 irradiated with the spot light remains irradiated with the spot light.

The wireless tags 101, other than the one being irradiated with the spot light, use part of the radio wave from the RFID reader 1212 and each return a radio wave carrying the reagent information.

With the acquisition function 1262, the control circuitry 126 receives electric signals based on the radio waves sent from the wireless tags 101. The control circuitry 126 decodes the received electric signals to acquire the reagent information. This enables collectively acquiring the set of reagent information of the reagent containers 100 which are not being irradiated with the spot light, among the reagent containers 100 on the reagent tray 127. The control circuitry 126 causes the storage circuitry 124 to store the acquired reagent information.

When the acquired reagent information has been stored in the storage circuitry 124, the control circuitry 126 performs the specifying function 1264. With the specifying function 1264, the control circuitry 126 checks the sets of reagent information stored in the storage circuitry 124 and acquired before and during the spot light emission, against one another. The control circuitry 126 specifies the reagent information that is included in the reagent information set stored before the spot light emission but not in the reagent information set stored during the spot light emission, as the reagent information of the reagent container 100 located at the initial position on the reagent tray 127.

Upon specifying the reagent information corresponding to the reagent container 100 located at the initial position, the control circuitry 126 controls the emission circuitry 1213 to stop the emission of the spot light. Also, upon specifying the reagent information corresponding to the reagent container 100 located at the initial position, the control circuitry 126 performs the determination function 1265. With the determination function 1265, the control circuitry 126 compares the specified reagent information with the reagent information of the replacement target reagent container 100. If, for example, the specified reagent information and the reagent information of the replacement target reagent container 100 are indicative of, for example, the same reagent name, the same reagent manufacturer code, the same reagent item code, and so on, the control circuitry 126 determines that the reagent container 100 corresponding to the specified reagent information is the required reagent container 100.

Upon determining that the reagent container 100 located at the initial position is the reagent container 100 desired by the operator, the control circuitry 126 performs the operation function 1261. With the operation function 1261, the control circuitry 126 controls the robot arm 121 to replace the replacement target reagent container 100 with the reagent container 100 located at the initial position. More specifically, and for example, the control circuitry 126 controls the robot arm 121 to pick up the replacement target reagent container 100 from the first-reagent depository 204 or the second-reagent depository 205, and loads the reagent container 100 located at the initial position on the reagent tray 127 into the position in the depository where the replacement target reagent container 100 has been removed.

Subsequently, the control circuitry 126 checks if there are other reagent containers 100 that have been designated as the replacement targets. If there are other replacement targets, the control circuitry 126 with the operation function 1261 controls the robot arm 121 to move the emission circuitry 1213 provided at the robot arm 121 toward the reagent container 100 located at a second position that is preset on the reagent tray 127.

The control circuitry 126 controls the emission circuitry 1213 to emit the spot light to the wireless tag 101 affixed to the reagent container 100 located at the second position. The control circuitry 126 utilizes the RFID reader 1212 to acquire the reagent information of the reagent containers 100 other than the one located at the second position, and causes the storage circuitry 124 to store the acquired reagent information. Then, by checking the reagent information sets stored before and during the emission of the spot light against one another, the control circuitry 126 specifies the reagent information corresponding to the reagent container 100 located at the second position.

Upon specifying the reagent information corresponding to the reagent container 100 located at the second position, the control circuitry 126 lets the spot light emission stop, and compares the specified reagent information with the reagent information of the replacement target reagent container 100. If it is determined that the reagent container 100 located at the second position is the reagent container 100 desired by the operator, the control circuitry 126 with the operation function 1261 controls the robot arm 121 to replace the replacement target reagent container 100 with the reagent container 100 located at the second position. The control circuitry 126 repeats the above operations for all the reagent containers 100 designated as the replacement targets.

If the specified reagent information and the reagent information of the replacement target reagent container 100 do not conform to each other, the control circuitry 126 determines that the reagent container 100 corresponding to the specified reagent information is not the required reagent container 100. If the reagent container 100 corresponding to the specified reagent information is not the intended one, the control circuitry 126 with the operation function 1261 controls the robot arm 121 to move the emission circuitry 1213 provided at the robot arm 121 toward the reagent container 100 located at the next position on the reagent tray 127.

In the second embodiment as described, the wireless tag 101 that changes the response state according to the receipt of the electromagnetic wave is affixed to each of the multiple reagent containers 100. The emission circuitry 1213 switches the response state of one of the wireless tags 101 affixed to the reagent containers 100. Together, the RFID reader 1212 is caused to send out a wide-coverage radio wave before and after the response state is changed, so that the set of reagent information stored in the wireless tags 101 affixed to the reagent containers 100 is acquired at each timing. Thus, the automatic analyzing apparatus 1A according to the second embodiment can acquire reagent information sets differing between the timing before the emission of the electromagnetic wave and the timing after the change of the response state due to the emission of the electromagnetic wave.

Also, according to the second embodiment, the control circuitry 126 with the acquisition function 1262 controls the RFID reader 1212 so that the set of reagent information stored in the wireless tags 101 affixed to the reagent containers 100 is acquired at each of the timing before switching the response state of the wireless tag 101 and the timing after switching the response state. With the specifying function 1264, the control circuitry 126 specifies the reagent information of the reagent container 100 located at a given position on the reagent tray 127, based on the sets of reagent information acquired before and after switching the response state of the wireless tag 101. Then, the control circuitry 126 with the determination function 1265 determines whether or not the reagent container 100 corresponding to the specified reagent information is applicable to the replacement target reagent container 100. Therefore, the automatic analyzing apparatus 1A according to the second embodiment can specifically spot the reagent container 100 that matches the replacement target reagent container 100 in the first-reagent depository 204 or the second-reagent depository 205, among the multiple reagent containers 100 placed on the reagent tray 127.

Note that the second embodiment has been described assuming that the wireless tags 101 are each furnished with the receive circuitry 1011 adapted to sense the spot light to generate electric signals. However, this is not a limitation. The wireless tags 101 may each include, for example, a mechanical contact region instead of the receive circuitry 1011. In this instance, the forefront of the holder 1211 of the robot arm 121 is provided with one or more conductive rod members, e.g., a probe, as the switcher, instead of the emission circuitry 1213.

In light of at least one embodiment set forth in the foregoing disclosures, the automatic analyzing apparatus 1, as well as the automatic analyzing apparatus 1A, can read the information stored in the wireless tags of the reagent containers kept in the reagent depositories, or placed on the reagent tray, while allowing the distinction as to which reagent container each information belongs to.

The term "processor" used in the first and second embodiments refers to, for example, a central processing unit (CPU) or a graphics processing unit (GPU), or various types of circuitry which may be an application-specific integrated circuit (ASIC), a programmable logic device (such as a simple programmable logic device (SPLD), a complex programmable logic device (CPLD), or a field programmable gate array (FPGA)), and so on. The processor reads the programs stored in storage circuitry and executes them to realize the respective functions. The programs may be incorporated directly in the circuitry of the processor, instead of being stored in the storage circuitry. In this case, the processor reads the programs incorporated in its circuitry and executes them to realize the respective functions. Each processor applicable to the embodiments is not limited to single circuitry. A plurality of independent circuitry members may be combined into one processor so that the multiple functions are realized. Furthermore, a plurality of structural components in the embodiments may be integrated into one processor so that the multiple functions are realized.

While certain embodiments have been described, they have been presented by way of example only, and are not intended to limit the scope of the inventions. Indeed, the novel embodiments described herein may be embodied in a variety of other forms. Furthermore, various omissions, substitutions, and changes in the form of the embodiments may be made without departing from the spirit of the inventions. The accompanying claims and their equivalents are intended to cover such forms or modifications as would fall within the scope and the spirit of the inventions.

What is claimed is:

1. A reagent container stock apparatus for use in an automatic analyzing apparatus comprising:
    at least one reagent depository;
    at least one wave radiator configured to send a radio wave to a plurality of wireless tags, the wireless tags being comprised by respective reagent containers in the reagent depository or by respective reagent containers at a reagent retaining space;
    at least one wave receiver configured to receive return radio waves from the wireless tags that have received the radio wave;
    at least one switcher configured to change a response state of one of the wireless tags; and
    processing circuitry configured to (a) specify reagent information corresponding to the reagent container that comprises the response state-changed wireless tag, based on the return radio waves received before and after the response state is changed and b) specify a location in the reagent depository at which the reagent container corresponding to the specified reagent information is present.

2. The reagent container stock apparatus according to claim 1, wherein the processing circuitry is configured to specify the location based on a position for the switcher to change the response state.

3. The reagent container stock apparatus according to claim 1, further comprising a memory configured to store locations of the reagent containers in the reagent depository.

4. The reagent container stock apparatus according to claim 1, further comprising an aspirator configured to aspirate a reagent in the reagent containers in the reagent depository at a predetermined aspiration position,
wherein the switcher is configured to change the response state of the wireless tag that is comprised by the reagent container located at the aspiration position.

5. The reagent container stock apparatus according to claim 1, wherein the processing circuitry is configured to cause the switcher to irradiate one of the wireless tags with an electromagnetic wave of a frequency higher than the radio wave, so that the response state of said one of the wireless tags is changed.

6. The reagent container stock apparatus according to claim 1, wherein the processing circuitry is configured to associate the specified reagent information with a location in the reagent depository, at which the reagent container that comprises the response state-changed wireless tag is present.

7. The reagent container stock apparatus according to claim 6, further comprising a writer configured to write information for the location into the wireless tag to which the specified reagent information belongs.

8. The reagent container stock apparatus according to claim 1, wherein the switcher is disposed at least in the reagent depository.

9. The reagent container stock apparatus according to claim 1, wherein, responsive to designating at least one of the reagent containers in the reagent depository, the processing circuitry determines if the reagent container corresponding to the specified reagent information matches the designated reagent container.

10. The reagent container stock apparatus according to claim 9, further comprising a loader configured to put the reagent container corresponding to the specified reagent information into the reagent depository, in place of the designated reagent container.

11. The reagent container stock apparatus according to claim 10, wherein the switcher is disposed at least at the loader.

12. A reagent container stock apparatus comprising:
at least one reagent depository for a plurality of reagent containers that comprise wireless tags, respectively;
at least one switcher in the reagent depository, the switcher configured to change a response state of one of the wireless tags in the reagent depository;
at least one wave radiator configured to send a radio wave to the wireless tags in the reagent depository before and after the response state is changed; and
at least one wave receiver configured to receive return radio waves from the wireless tags that have received the radio wave, wherein
the reagent depository includes an aspiration position for a reagent in one of the reagent containers to be aspirated, and
the switcher is configured to change the response state of the wireless tag that is comprised by the reagent container located at the aspiration position.

13. The reagent container stock apparatus according to claim 12, wherein the switcher is configured to emit an electromagnetic wave of a frequency higher than the radio wave, so that the response state of said one of the wireless tags is changed.

14. The reagent container stock apparatus according to claim 12, further comprising a writer configured to write information for a location of a given one of the reagent containers in the reagent depository, into the wireless tag that is comprised by said given one of the reagent containers.

15. A specifying method for use with the reagent container stock apparatus of claim 1, comprising:
sending a first radio wave to the plurality of wireless tags each storing reagent information;
receiving a first return signal comprising the reagent information from each of the wireless tags, the first return signal sent in response to the first radio wave;
acquiring a first reagent information set based on the first return signal;
changing a response state of one of the wireless tags;
sending a second radio wave to the wireless tags including the response state-changed wireless tag;
receiving a second return signal comprising the reagent information from each of the wireless tags, the second return signal sent in response to the second radio wave;
acquiring a second reagent information set based on the second return signal; and
specifying the reagent information corresponding to the reagent container comprising the response state-changed wireless tag, based on the first and the second reagent information sets.

* * * * *